United States Patent
Oono et al.

[19]

[11] Patent Number: 5,825,555
[45] Date of Patent: Oct. 20, 1998

[54] BEAM PROJECTING APPARATUS

[75] Inventors: Masahiro Oono; Tunehiko Sonoda; Satoru Tachihara; Koichi Maruyama, all of Tokyo, Japan

[73] Assignee: Asahi Kogaku Kogyo Kabushiki Kaisha, Tokyo, Japan

[21] Appl. No.: 529,729

[22] Filed: Sep. 18, 1995

[30] Foreign Application Priority Data

| Sep. 19, 1994 | [JP] | Japan | 6-223248 |
| Sep. 19, 1994 | [JP] | Japan | 6-223250 |
| Sep. 19, 1994 | [JP] | Japan | 6-223251 |
| Jan. 12, 1995 | [JP] | Japan | 7-003368 |
| Mar. 2, 1995 | [JP] | Japan | 7-043073 |

[51] Int. Cl.[6] .......................... G02B 13/08; G02B 13/12; G01C 1/10
[52] U.S. Cl. .......................... 359/668; 356/149; 356/250; 359/669; 359/670; 359/719
[58] Field of Search .................... 359/668, 669, 359/670, 671, 719; 356/149, 250

[56] References Cited

U.S. PATENT DOCUMENTS 5,373,395 12/1994 Adachi ..................... 359/670
5,596,456 1/1997 Luccke ..................... 359/670

FOREIGN PATENT DOCUMENTS 2179412 7/1990 Japan.
5272967 10/1993 Japan.
5322563 12/1993 Japan.

*Primary Examiner*—Scott J. Sugarman
*Attorney, Agent, or Firm*—Greenblum & Bernstein, P.L.C.

[57] ABSTRACT

A beam projecting apparatus has a light source and a reflecting device for reflecting and rotating a bundle of light emitted from the light source for forming a reference plane. A shape converting optical system is provided in an optical path from the light source to the reflecting device for converting the bundle of light from an elliptical sectional shape to a circular sectional shape.

38 Claims, 37 Drawing Sheets

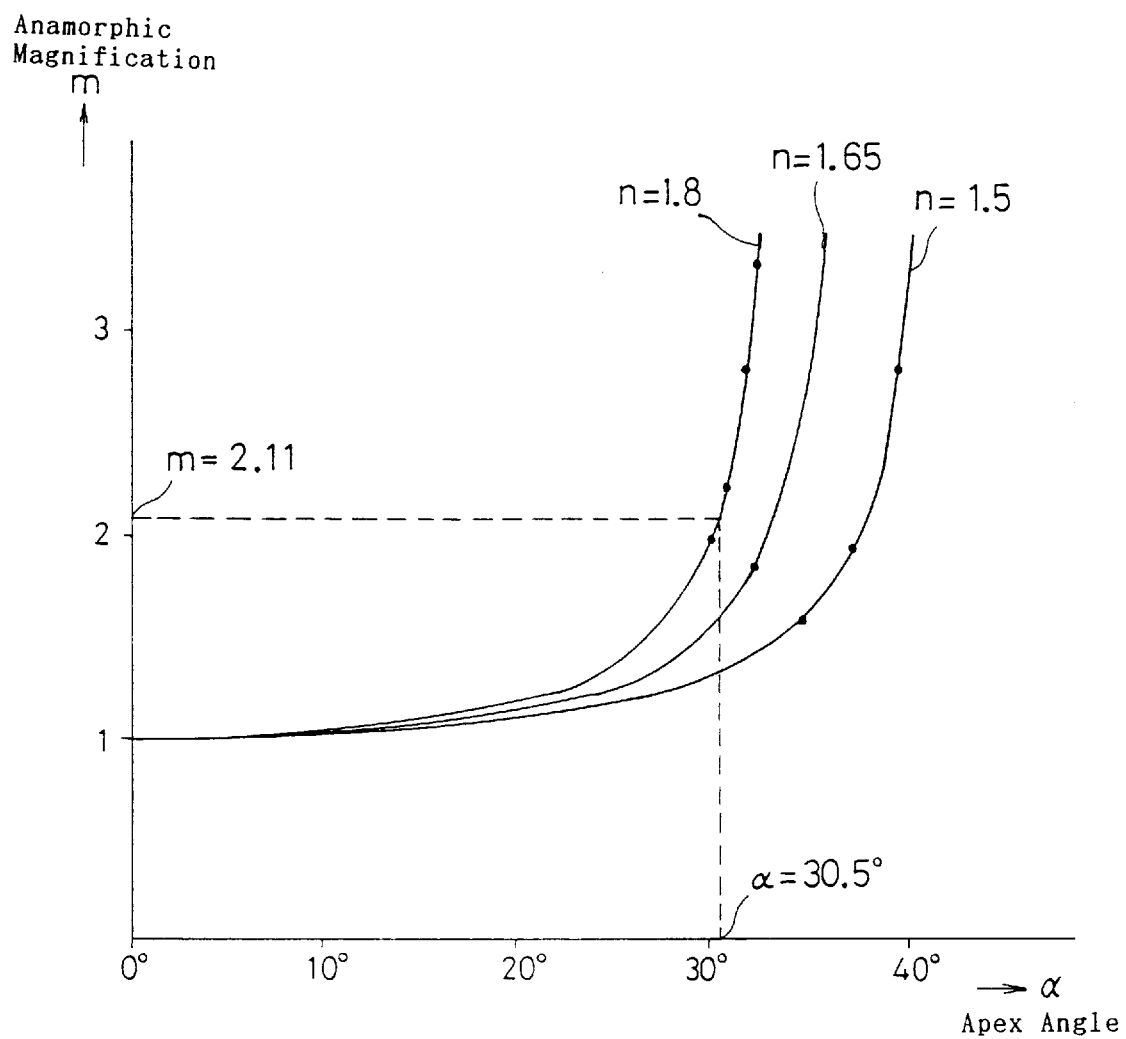

BEAM PROJECTING APPARATUS

BACKGROUND OF THE INVENTION

1. Field of the Invention

The present invention relates to an apparatus for projecting nearly parallel beams of light, in order to define a reference plane.

2. Description of Related Art

In general, in civil or architectural engineering, in order to define a reference plane, an object to be surveyed is scanned by laser beams, projected from a rotatable light emitter belonging to a laser projector (a so-called "laser planer"), which is used to measure the height of a laser beam spot formed on the object to be surveyed to thereby determine an aiming point or the height of the object, etc.

In such a known laser projector, a Helium-Neon laser (He-Ne laser) is usually used as a light source. Recently, a laser diode (LD) has also been used in place of the He-Ne laser.

A laser projector using a laser diode, can be made smaller and consumes less energy than a laser projector using a He-Ne laser. However, since the sectional shape of the bundle of beams emitted from the planar emitting surface of the laser diode is elliptical, or else the laser beams emitted from the laser diode would have an astigmatic difference, a laser projector using a laser diode has the following drawbacks:

① when the laser beam, whose sectional shape is elliptical, is emitted from the rotating laser emitter, the laser beam spot rotates about its optical axis, and hence it is difficult to detect the center of the beam spot, thus making the determination of a horizontal reference position difficult;

② if a detector, for example, is provided to detect the position of the laser beam, whose sectional shape is elliptical, the quantity or condition of the laser beam to be received by a light receiving element varies depending on the angular position of the major axis of the elliptical beam spot, and hence the wave shape of the detection signal to be output from the detector varies accordingly, thus resulting in a detecting failure; and, ③ it is difficult to reduce the beam spot diameter, due to the astigmatic difference of the laser beams emitted from the laser diode, so that little or none of the beam can be emitted a long distance.

To eliminate the above mentioned defects ① and ②, it is well known to split the laser beam, emitted from the laser diode, into two beams of an elliptical sectional shape having a rotational difference of 90 degrees. The split beams are then combined so that the major axes cross, and are thus simultaneously projected. However, in such a known laser projector, the above mentioned drawbacks ① and ② can be solved to some extent, but it is impossible to simplify the agreement with the reference point, or to completely eliminate the irregularity of the detection sensitivity of the detector, since laser beams having an elliptical section, combined such that the major axes thereof cross, are used as detecting light. Moreover, since an optical system used to split the laser beam into two beams of an elliptical sectional shape, having a rotational difference in the major axes of 90 degrees therebetween is complex, the laser projector is expensive. In addition, in the prior art there is no solution to drawback ③ mentioned above.

It is also known to intentionally provide an eclipse, to the elliptical laser beam bundle, using a collimating lens having a small numerical aperture (NA), to thereby obtain a bundle of laser beams having a circular section. However, in this method, since optical energy is wasted due to the eclipse of the laser beams, it is necessary to use a laser diode of high power resulting in an increase in the electric current consumption and in the production cost.

However a laser projector using a laser diode can be made small and can reduce the consumption of electric current, although the laser beam loses optical energy. Namely, in the known laser projector, laser beams emitted from a laser diode are partly reflected by a half mirror surface, located in the vicinity of the laser diode, to produce first projecting laser beams and to emit the beam toward the outside; and are partly transmitted through the half mirror surface. The laser beams transmitted through the half mirror surface are then reflected by a reflecting mirror, provided behind the half mirror surface, to return to the half mirror surface to thereby produce second projecting laser beams whose direction is opposite (by 180 degrees) that of the first projecting laser beams. The laser beams reflected by the reflecting mirror toward the half mirror surface are partly transmitted through the half mirror surface toward the laser source without being totally reflected thereby. This causes a loss of optical energy (in respect of the beams). Moreover, due to light returning to the laser source, the oscillation of the laser source becomes unstable.

In the above-mentioned known laser projector, laser beams emitted from a laser diode are linearly polarized light. Consequently, if those laser beams, which are incident upon the reflecting mirror secured to a mirror holder (light emitting portion) which rotates about a shaft at a predetermined angle with respect to the shaft and in parallel with the shaft, are reflected and projected outward by the reflecting mirror, the line normal to the reflecting surface of the reflecting mirror, which rotates together with the shaft, changes position relative to the laser beams of linearly polarized light, so that the intensity of the laser beams to be emitted continuously changes, thus resulting in an attenuated visibility of the beams.

A laser projector using a laser diode is usually used over a wide distance range, ranging from a close distance of 0.5–1.5 m to a far distance of 100–200 m. When the laser projector is used at different temperatures, the wavelength of the laser beams emitted from the laser diode varies in accordance with the change in temperature. Since the laser beams emitted through a lens have a chromatic aberration, it is necessary to perform a focusing operation to absorb the displacement of the position of the beam waist owing to the chromatic aberration. Consequently, in the case of a laser projector which is often used outdoors, the focusing of the laser beams must be easy to carry out.

In a conventional laser projector in which the laser beams emitted from the laser diode are converged by a condenser lens, reflected by a prism, and made incident upon an objective lens, the objective lens is moved in the optical axis direction to carry out the focusing of the laser beams. In this structure, since the prism is located in the optical path of the laser beams emitted from the laser diode, it is difficult to make the optical axis of the condenser lens coincident with the optical axis of the objective lens which moves during focusing.

Furthermore, since the convergence of the laser beams depends on diffraction, in order to emit the laser beams to a far distance, it is necessary to increase the aperture of the objective lens to thereby increase the diameter of the bundle of beams in accordance with the desired distance to which the beams should reach. However, this increases the burden on the focusing driving system to reciprocally move the large diameter objective lens, which requires a high power motor, etc.

In a laser projector which is used over a wide distance range from a close distance to a far distance, since the laser beams to be emitted change in diameter upon diffraction, no perfectly parallel beams can be produced. Consequently, it is necessary to increase the beam diameter of those beams to be emitted in order to make it possible for the beams to reach the far distance. Conversely, over a close distance range, the diameter of the beams to be emitted is preferably reduced to visually determine the correct position of an object.

If the beam diameter fails to be appropriately set in accordance with the distance, when the height of the beam is detected by a detector, the detection sensitivity of the detector varies depending on the distance to be measured.

As can be seen from the foregoing, in order to make it possible to use a laser projector over a wide distance range outdoors, the diameter of the laser beams must be easily varied. However, in the prior art, there is no means by which the beam diameter can be easily varied.

SUMMARY OF THE INVENTION

It is an object of the present invention to provide a simple and inexpensive laser projecting apparatus in which the aiming of the beams can be easily carried out and the detection sensitivity of the beams by a detector is uniform regardless of direction. Another object of the present invention is to provide a laser projector which does not suffer from the problem of not being able to reduce the beam diameter due to an astigmatic difference of the laser beams to be emitted.

To achieve the object, according to the present invention, there is provided a light source, a reflecting mechanism for reflecting and rotating a bundle of light emitted from the light source to form a reference plane, and, a shape converting optical system is provided in an optical path from the light source to the reflecting mechanism to convert a shape of bundled light from an elliptical sectional shape into a circular sectional shape.

With this arrangement, not only can aiming be simplified without complicating the structure of the optical system and increasing the production cost thereof, but the detection sensitivity of the beams in any direction, by a sensor can also be made uniform.

A collimating lens can be provided between the light source and the shape converting optical system to collimate the bundle of light emitted from the light source, so that an astigmatic difference contained in the light bundle can be corrected by varying the distance between the light source and the collimating lens. With this arrangement, the problem of not being able to reduce the beam diameter due to the astigmatic difference of the beams to be projected can be solved.

Another object of the present invention is to provide a beam projecting apparatus in which no adjustment of the angle defined between the half mirror and the reflecting mirror is necessary to enhance the reliability of the reflection of the beams, and no rotation of the beams transmitted through the half mirror along a circle whose radius corresponds to a lateral deviation takes place.

To achieve the object, according to an aspect of the present invention, a light source, and, an optical member for reflecting and rotating a bundle of light emitted from the light source to form a reference plane are provided. The optical member comprises, a prism having an incident surface upon which the light bundle from the light source is incident, a first reflecting surface which is provided with a semitransparent film and which receives the light incident upon the incident surface, and a second reflecting surface which defines an angle of 45 degrees with respect to the first reflecting surface and which reflects the light reflected by the first reflecting surface. Also provided are an emission surface from which the light reflected by the second reflecting surface is emitted, and, a wedge-shaped prism which is attached to the first reflecting surface of the prism through the semitransparent film and which is provided with a second emission surface parallel with the incident surface.

With this structure, no adjustment of the angle between the half mirror and the reflecting mirror is necessary. Moreover, the laser beams transmitted through the half mirror do not rotate, thus resulting in the production of high quality beams.

Another object of the present invention is to provide a beam projecting apparatus in which when a laser diode is used as the light source there is no optical energy loss, no light returns to the laser diode, and there is no change in the intensity of light to be projected.

To achieve this object, according to another aspect of the present invention, there is provided a light source, a reflecting means for reflecting and rotating a bundle of light emitted from the light source to form a reference plane, a polarization beam splitting element which reflects linearly polarized light emitted from the light source toward the reflecting mechanism, a retarder which varies the polarization of the light reflected by the polarization beam splitting element and travelling toward the reflecting mechanism, and, a beam splitting device for permitting a part of the light transmitted through the phase element to pass therethrough toward the reflecting means and for reflecting the remaining part of the light in the direction opposite to the direction of travel thereof.

With this arrangement, if a laser diode is used as the light source, there is no optical energy loss. Moreover, the light reflected by the beam splitting device is totally transmitted through the polarization beam splitting element, and accordingly, no light returns to the laser light source. The returning light would otherwise make the oscillation of the laser diode unstable.

Still another object of the present invention is to provide a beam projecting apparatus in which the focusing at a desired distance can be easily carried out by a small and simple optical system whose optical axis does not tend to be deviated. The invention is also aimed at the provision of a beam projecting apparatus in which the output of a driving system, such as a motor to effect focusing, can be reduced.

To achieve this object, according to the present invention, there is provided a beam projecting apparatus in which a bundle of light emitted from a light source is reflected by a reflecting mechanism and projected as nearly parallel beams of, light. The apparatus a collimating lens which collimates the light emitted from the light source, and a beam diameter widening optical system provided between the collimating lens and the reflecting mechanism. The beam diameter widening optical system includes a first lens group of negative power located closer to the collimating lens than a second lens group of positive power which is provided at a location closer to the reflecting mechanism than the first lens group, to magnify the diameter of the light emitted from the light source before reaching the reflecting mechanism. An adjusting device for adjusting the relative position of the first and second lens groups to thereby adjust the position of a beam waist of the light to be projected is also provided.

With this arrangement, focusing can be easily carried out to adjust the position of the beam waist. Furthermore, the focusing optical system does not include a reflecting member between the first and second lens groups and hence can be made small and simple. The relative position of the first and second lens groups can be adjusted in the same optical path.

If the second lens group is fixed between the collimating lens and the reflecting mechanism, and if the first lens group is held by a lens holder which is movable with respect to the second lens group, then the burden on the driving system to move the first lens group relative to the second lens group can be reduced.

Another object of the present invention is to provide a beam projecting apparatus in which an optimum or desired beam diameter can be obtained at any desired distance.

To achieve this object, according to another aspect of the present invention, there is provided a light source, a device for projecting a bundle of light emitted from the light source as nearly parallel beams of light, and, a beam diameter varying optical system which is provided in an optical path of the light emitted from the light source to vary the diameter of a bundle of beams of light at a variable magnification.

With this arrangement, the diameter of the beams to be projected can be easily set at an optimum, or at a desired value at a desired distance. Consequently, the beam projector can be effectively used outdoors. Therefore, for example when the height of a beam spot is detected by a detector, the sensitivity of detection is constant regardless of the measurement distance and the beam spot can be certainly and visually confirmed.

According to another aspect of the present invention, there is provided a light source, a device for projecting a bundle of light emitted from the light source as nearly parallel beams of light, and, a variable diaphragm, provided in an optical path of the light emitted from the light source, to vary the amount of a bundle of beams of light to be light intercepted, to thereby vary the beam diameter.

With this structure, the diameter of the beams to be projected can be easily set at an optimum value, or at a desired value at an optional distance and hence the beam projector can be effectively used outdoors.

The present disclosure relates to subject matter contained in Japanese Patent Application Nos. 6-223248 (filed on Sep. 19, 1994), 6-223250 (filed on Sep. 19, 1994), 6-223251 (filed on Sep. 19, 1994), 7-3368 (filed on Jan. 12, 1995) and 7-43073 (filed on Mar. 2, 1995) which are expressly incorporated herein by reference in their entireties.

BRIEF DESCRIPTION OF THE DRAWINGS

The invention will be described below in detail with reference to the accompanying drawings, in which:

FIG. 7 is a graph representing the correlation between the anamorphic magnification and an apex angle of an anamorphic prism;

DETAILED DESCRIPTION OF THE PREFERRED EMBODIMENT

Figure 1:
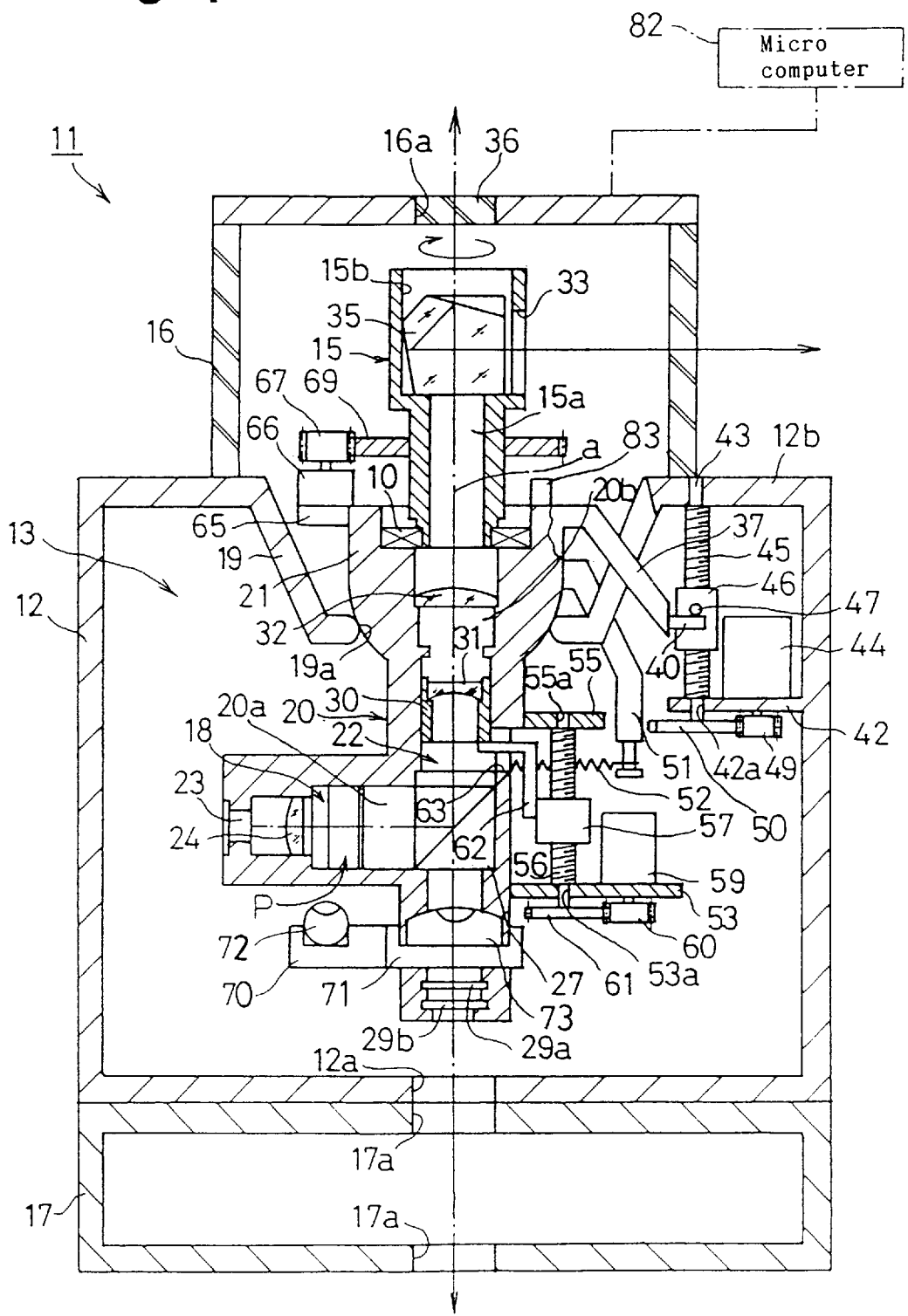
FIG. 1 is a sectional view of a laser projecting apparatus according to a first embodiment of the present invention.

FIG. 1 shows a sectional view of a laser projecting apparatus (beam projector) according to a first embodiment of the present invention. The laser projector 11 is comprised of a substantially cylindrical housing 12, and a projector body 13 provided in the housing 12. The housing 12 is provided on the upper end thereof with a cylindrical transparent member 16 secured thereto, which surrounds a rotatable light emitter 15 of the projector body 13. The housing 12 is also provided on the lower end thereof with a battery receptacle 17 secured thereto, in which a battery (or batteries, not shown) is received to drive the laser projector 11.

The housing 12 is provided on the upper portion thereof with a substantially conical sliding movement guiding portion 19, and on the lower end with a circular center hole 12a. The circular hole 12a is aligned with a circular center hole 17a formed in the battery receptacle 17, so that laser beams emitted from above can be projected downwards and outwards through the circular holes 12a and 17a. The sliding movement guiding portion 19 is provided, on the lower end of its truncated cone, with a sliding hole 19a whose diameter is smaller than the outer diameter of the spherical part of a bulged portion 21, which will be discussed hereinafter.

The projector body 13 includes a hollow member 20 with a vertically extending inner bore and a rotatable light emitter 15 which is rotatably supported on the hollow member 20 through a bearing 10. The bulged portion 21 of the hollow member 20 is supported in the sliding hole 19a, so that the rotatable light emitter 15 (or the projector body 13) can be rotated or inclined in any direction about the center rotation axis "a" while contacting the spherical part of the bulged portion 21 with the sliding hole 19a, to adjust a reference plane defined by the laser beams $L_3$ (FIG. 2) with respect to the horizontal plane.

The hollow member 20 is provided therein with orthogonal optical paths 20a and 20b for the laser beams. There is a laser diode 23 which emits visible laser beams, a collimating lens 24, and a shape converting optical system 18 which includes a pair of anamorphic prisms 25 and 26 (FIG. 12) for converting the sectional shape of a bundle of laser beams, in the optical path 20a. The optical path 20b, which extends in the direction of the rotation axis "a" of the rotatable light emitter 15, has a light emitting optical system 22.

The light emitting optical system 22 includes a polarization beam splitter 27 which receives the laser beams emitted from the shape converting optical system 18. The polarization beam splitter (PBS) 27 is provided (see FIG. 2) with a polarization beam splitting surface 27a and a ¼ λ plate (quarter-wave plate) 28 which is attached to the upper surface of the PBS 27, so that the axial direction of the ¼ λ plate 28 is inclined at 45 degrees with respect to the polarization direction of the incident light. The ¼ λ plate 28 is coated at the upper surface thereof with a semitransparent film 28a whose reflectance is around 10–20%, to permit the laser beams at a predetermined rate to pass therethrough toward the pentagonal prism 35 and to reflect the remaining part of the laser beams toward the polarization beam splitting surface 27a of the PBS 27.

The ¼ λ plate 28 provided between the PBS 27 and the semitransparent film 28a converts the linearly polarized laser beams, reflected by the PBS 27 and transmitted through the ¼ λ plate 28 toward the pentagonal prism 35, into circularly polarized light. A large part of the circularly polarized light is then transmitted through the semitransparent film 28a toward the pentagonal prism 35. The remaining part of the circularly polarized light is reflected by the semitransparent film 28a and is transmitted again through the ¼ λ plate 28, so that the light is converted to linearly polarized light having an opposite polarization direction. Consequently, the light projecting toward the polarization beam splitting surface 27*a* of the PBS 27 is totally transmitted through the polarization beam splitting surface 27*a* without being reflected thereby, i. e., without returning to the laser diode (laser source) 23. Note that if the ¼ λ plate 28 is made of glass whose basic refractive index is approximately 1.9, the surface reflectance thereof is about 10%, and hence the semitransparent film 28*a* can be dispensed with, thus leading to a reduction in the production cost.

There is a first lens group (front lens group or focusing lens) 31 having a negative power and a second lens group (rear lens group or objective lens) 32 having a positive power, above the PBS 27 in the optical path 20*b*. The second lens group 32 is fixed to the inner wall of the optical path 20*b* closer, than the first lens group 31, to the pentagonal prism 35. The first lens group 31 is held in a cylindrical holder 30, which is movable within the optical path 20*b* in the optical axis direction, so that the first lens group is moved close to or away from the second lens group 32. The first and second lens groups 31 and 32 constitute a beam expander (beam diameter varying optical system) BE.

The rotatable light emitter 15 includes an optical path portion 15*a* which is aligned with and connected to the optical path 20*b* and a pentagonal prism receiving portion 15*b* of a diameter larger than the optical path portion 15*a*, and connected to the optical path portion 15*a*. The pentagonal prism receiving portion 15*b* is provided on the side wall thereof with an emission window 33 through which the polarized laser beams, reflected by the pentagonal prism 35 provided in the pentagonal prism receiving portion 15*b*, are projected outward. The pentagonal prism receiving portion 15*b* has an open upper end. The optical axis of the optical path 15*a* is aligned with the center axis of a light transmitting member 36 which is fitted in the upper central circular hole 16*a* of the transparent member 16.

Figure 2:
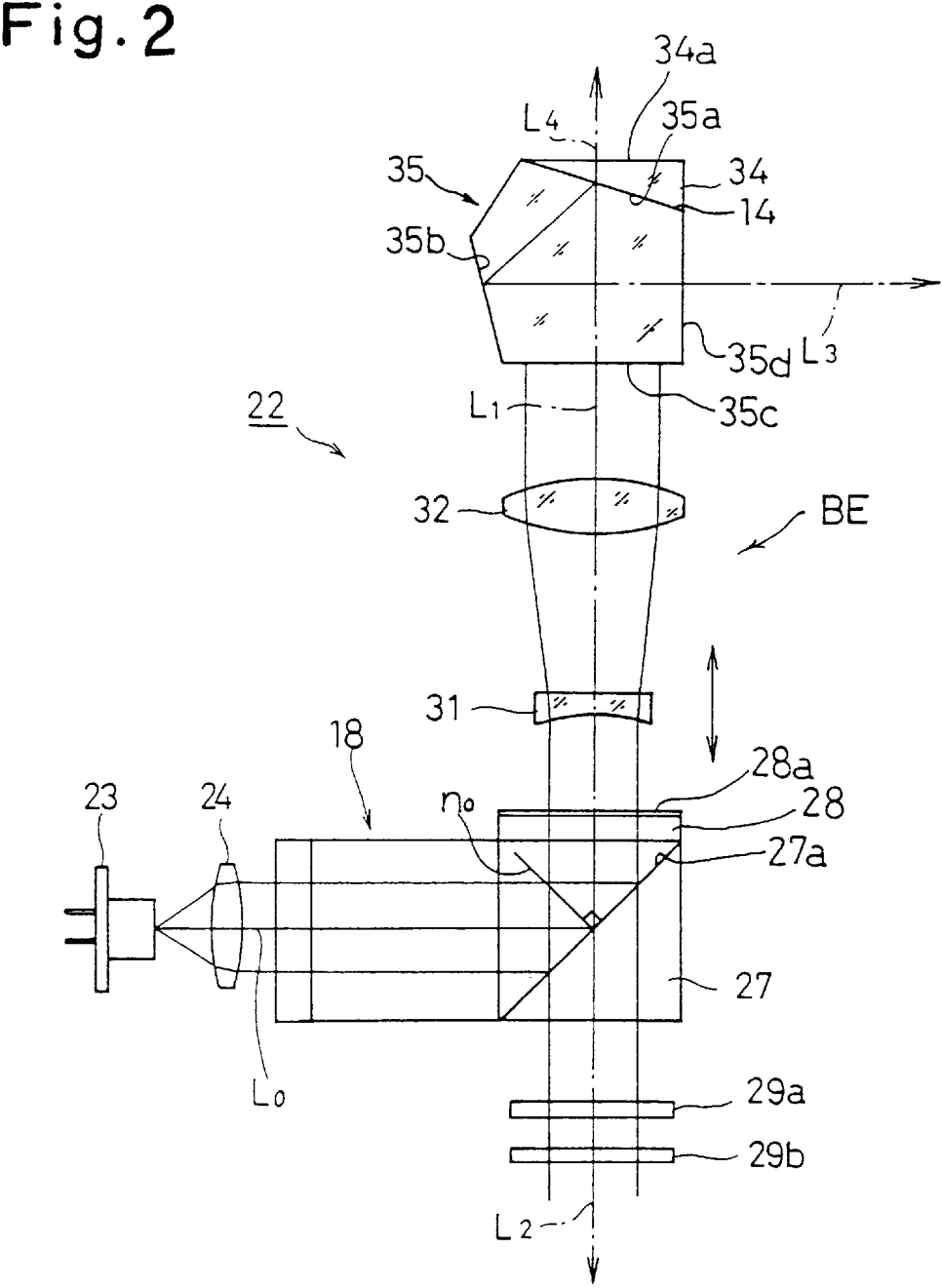
FIG. 2 is an enlarged schematic view of the main components of the laser projecting apparatus shown in FIG. 1.
Figure 18:
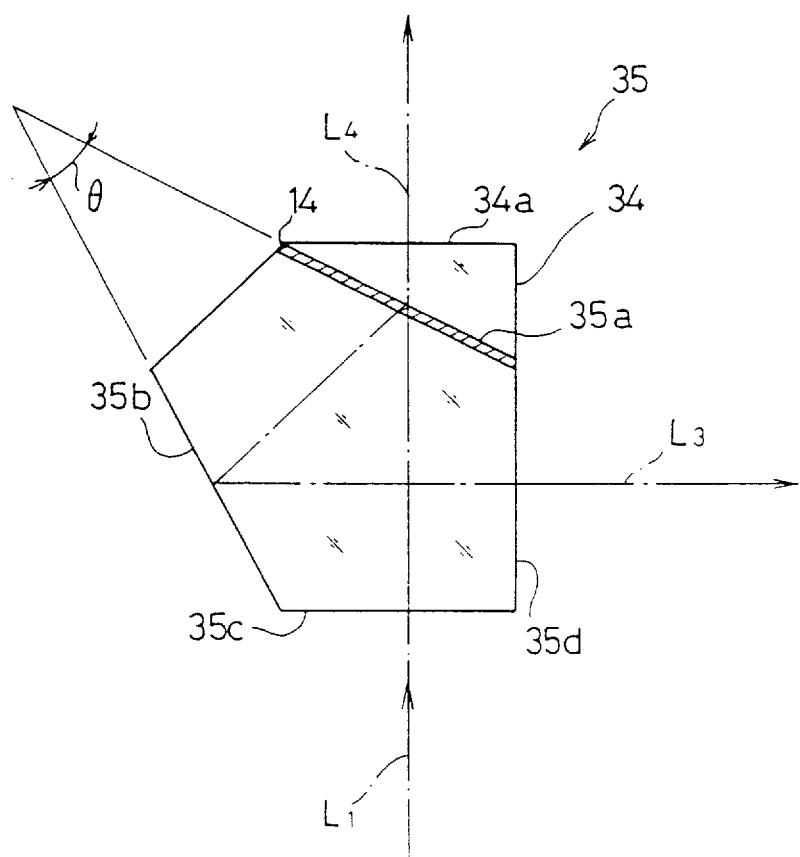
FIG. 18 is an enlarged side view of a pentagonal prism and a wedge-shaped prism in a laser projecting apparatus.
Figure 19:
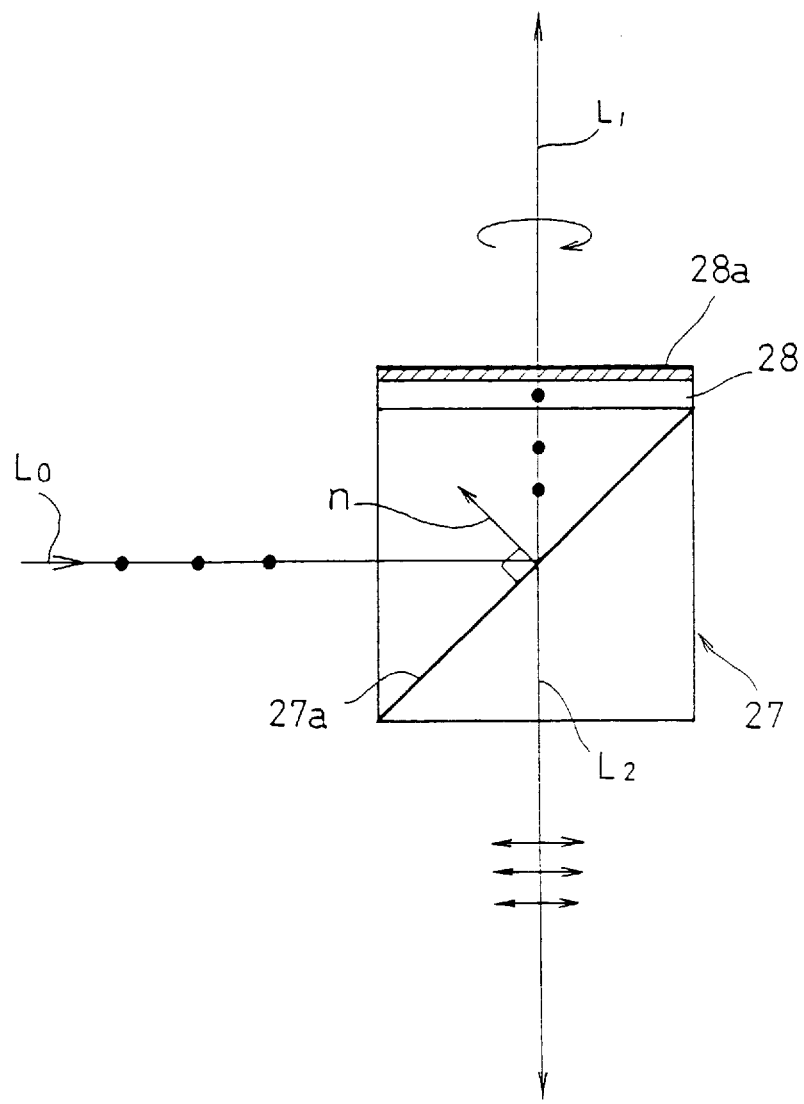
FIG. 19 is an enlarged side view of the polarization beam splitter shown in FIG. 2.

The pentagonal prism 35 is secured to the rotatable light emitter 15 of the projector body 13 so as to rotate together and constitutes a reflecting means for reflecting the laser beams on the axis "a" of the rotatable light emitter 15. As can be seen in FIG. 2, the pentagonal prism 35 is comprised of an incident surface 35*c* upon which the laser beams are made incident; a first reflecting surface 35*a* which is inclined at a predetermined angle with respect to the incident surface 35*c* and which is provided with a semitransparent film 14 whose reflectance is around 70–80%, so that those laser beams incident upon the incident surface 35*c* are made incident upon the first reflecting surface 35*a*; a second reflecting surface 35*b* which defines an angle θ (FIG. 18) of 45 degrees with respect to the first reflecting surface 35*a* and which reflects those laser beams reflected by the first reflecting surface 35*a*; and an emission surface 35*d* through which those laser beams reflected by the second reflecting surface 35*b* are emitted and which is perpendicular to the incident surface 35*c*. The second reflecting surface 35*b* is coated with an enhanced reflecting layer which is formed, for example, by the evaporation of aluminum. A wedge-shaped prism 34 is attached to the first reflecting surface 35*a* through the semitransparent film 14. The wedge-shaped prism 34 (FIG. 18) is constructed sucH that when the oblique surface thereof is attached to the first reflecting surface 35*a*, the upper emission surface 34*a* of the wedge-shaped prism 34 is parallel with the incident surface 35*c* of the pentagonal prism 35.

Figure 3:
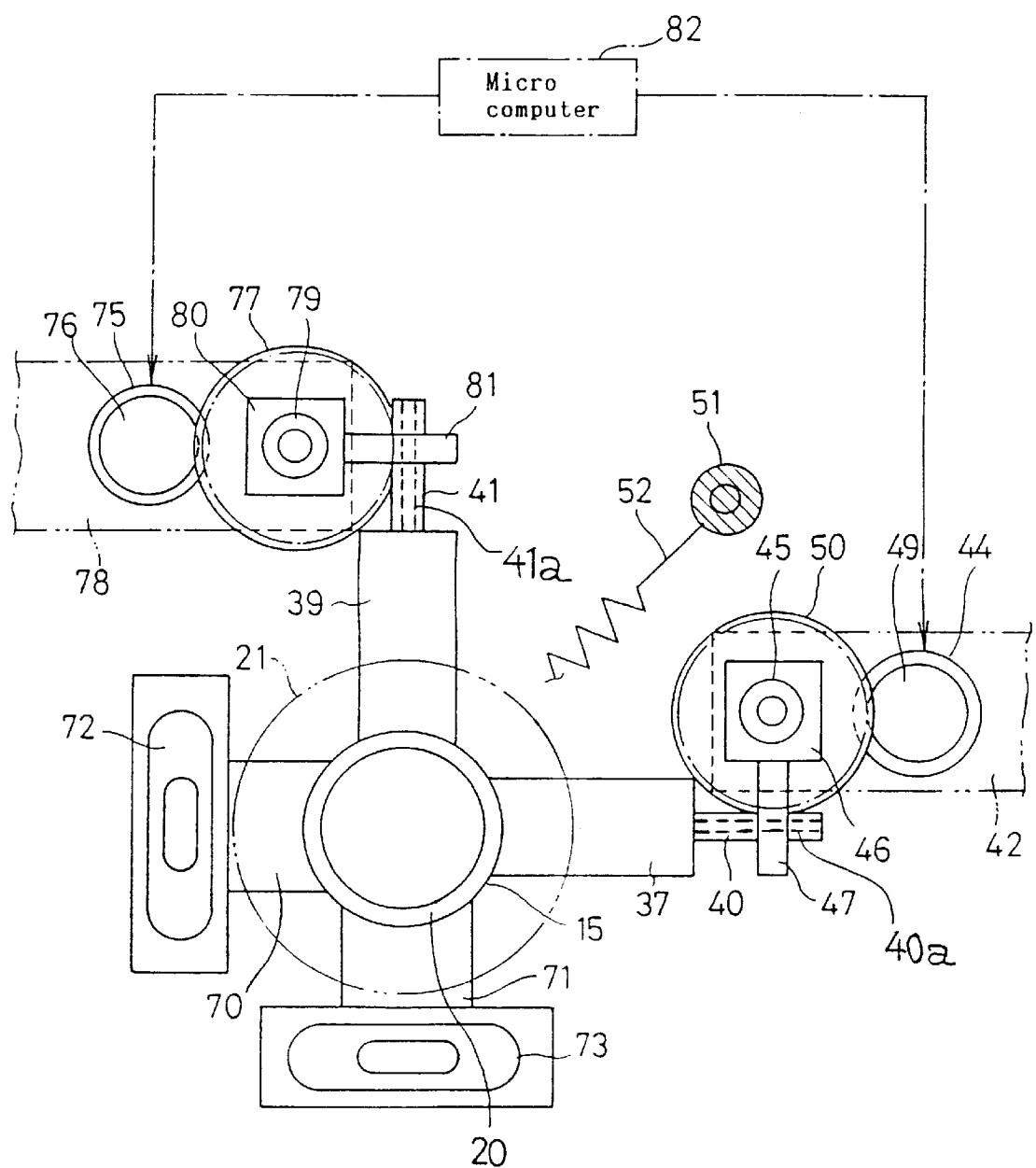
FIG. 3 is an enlarged plan view of the main components of the laser projecting apparatus shown in FIG. 1.

The hollow member 20 is comprised of a first tilting arm 37 which extends in the right hand direction in FIG. 1, and a second tilting arm 39 (FIG. 3) integral therewith, which extends in a direction perpendicular to the first tilting arm 37. The tilting arms 37 and 39 are bent and downwardly inclined at the upper part of the bulged portion 21 and are respectively provided on the front ends thereof with rollers 40 and 41 (which rotate about axes 40*a* and 41*a* respectively)whose centers are located in the same plane, which includes the center of the spherical part of the bulged portion 21.

The housing 12 is provided on the inner wall thereof with a bracket 42 which projects inward. The bracket 42 is formed with a gear supporting hole 42*a*. The housing 12 is provided on the upper wall 12*b* with a gear supporting hole 43 which is aligned with gear supporting hole 42*a*, so that the shaft of an adjusting screw 45 is rotatably fitted at the opposite ends thereof in the gear supporting holes 42*a* and 43. The bracket 42 holds a first level adjusting motor 44 secured thereto. The drive shaft of the first level adjusting motor 44 has a pinion 49 secured thereto, which is in mesh with a transmission gear 50 secured to the lower end of the adjusting screw 45. An adjusting nut 46 is screw-engaged with the adjusting screw 45, so that the adjusting screw 45 and the adjusting nut 46 constitute a feed screw mechanism. The adjusting nut 46 is provided on the outer peripheral surface thereof, with an outwardly projecting operation pin 47 which abuts against the roller 40 from above. The rotation of the adjusting nut 46 relative to the housing 12 is restricted by a supporting mechanism (not shown).

The housing 12 is provided on the inner wall thereof with an inwardly projecting bracket 78 (FIG. 3) which is in turn provided with a gear supporting hole (not shown) which is aligned with a similar gear supporting hole (not shown) formed in the upper wall 12*b* of the housing 12. The shaft of an adjusting screw 79 is rotatably fitted at the opposite ends thereof in the gear supporting holes. The bracket 78 holds a second level adjusting motor 75 secured thereto. The drive shaft of the second level adjusting motor 75 has a pinion 76 secured thereto, which is in mesh with a transmission gear 77 secured to the lower end of the adjusting screw 79. An adjusting nut 80 is screw-engaged with the adjusting screw 79, so that the adjusting screw 79 and the adjusting nut 80 constitute a feed screw mechanism. The adjusting nut 80 is provided on the outer peripheral surface thereof, with an outwardly projecting operation pin 81 which abuts against the roller 41 from above. The rotation of the adjusting nut 80 relative to the housing 12 is restricted by a supporting mechanism (not shown).

The housing 12 is provided on the inner wall thereof with a supporting projection 51 which is located by bisecting the angle defined between the first and second tilting arms 37 and 39 which are perpendicular to each other. There is a tensile spring 52 connected to the supporting projection 51 and the hollow member 20. Consequently, the rollers 40 and 41 of the hollow member 20 which are biased upward by an identical spring force, due to the tensile spring 52, are pressed against the operation pins 47 and 81, respectively. Namely, the hollow member 20 is biased at the lower end thereof toward the supporting projection 51 while the bulged portion 21 is supported in and by the sliding hole 19*a* (FIG. 1), so that the angular position of the hollow member 20 in the horizontal direction can be adjusted by the operation pins 47 and 81 which are moved up and down by the first and second level adjusting motors 44 and 75 which are driven in accordance with control signals supplied from a microcomputer 82. The hollow member 20 is provided on the lower portion thereof with brackets 70 and 71 which extend in directions opposite to the arms 37 and 39, respectively. The brackets 70 and 71 have level detecting sensors 72 and 73 attached thereto. The detection signals of the level sensors 72 and 73 are sent to the microcomputer 82.

The hollow member 20 is formed at the lower portion thereof with an outwardly projecting bracket 53 (FIG. 1). The hollow member 20 is also provided with an outwardly projecting bracket 55 located above and opposed to the bracket 53. The brackets 53 and 55 are respectively formed with opposed gear supporting holes 53a and 55a, so that the shaft of a lens moving screw 56 is rotatably fitted at the opposite ends thereof in the corresponding gear supporting holes 53a and 55a. The bracket 53 holds a lens driving motor 59 secured thereto. The drive shaft of the lens driving motor 59 has a pinion 60 secured thereto, which is in mesh with a transmission gear 61 secured to the lower end of the lens moving screw 56. A lens moving nut 57 is screw-engaged with the lens moving screw 56, so that the lens moving screw 56 and nut 57 constitute a feed screw mechanism.

An insertion window 63 is formed in the wall portion of the hollow member 20 that corresponds to the lens holder (sliding member) 30. One end of transmission link 62 is inserted in the insertion window 63 and secured to the lower end of the lens holder 30, the other end is secured to the lens moving nut 57. Consequently, when the lens moving motor 59 is driven in accordance with control signals supplied from the microcomputer 82, the lens moving nut 57 is moved up and down through the pinion 60, the transmission gear 61, and the lens moving screw 56, so that the first lens group 31 is moved up and down, through the link 62 and the lens holder 30, to control the focal length in order to appropriately converge the laser beams emitted from the rotatable light emitter 15.

An outwardly projecting bracket 65 is provided on the upper portion of the hollow member 20. The bracket 65 holds a rotating motor 66 secured thereto. The drive shaft of the motor 66 has a pinion 67 secured thereto, which is in mesh with a transmission gear 69 secured to the outer peripheral surface of the rotatable light emitter 15. Consequently, when the motor 66 is rotated in accordance with control signals sent from the microcomputer 82, the light emitter 15 is rotated relative to the hollow member 20 through the pinion 67 and the transmission gear 69.

There is a rotation detecting sensor 83 provided on the upper portion of the hollow member 20 on the opposite side of the bracket 65. The sensor 83 upwardly emits light, i.e., toward the transmission gear 69, so that the light is reflected by a predetermined pattern (not shown) provided on the lower surface (rear surface) of the transmission gear 69 and is thus received by the sensor 83. The detection signal representing the received light is supplied to the microcomputer 82 which calculates the angular displacement of the rotatable light emitter 15 in accordance with the detection signal.

The shape converting optical system 18 for converting the sectional shape of the laser beams, which is schematically shown in FIGS. 1 and 2 will now be discussed.

Figure 4:
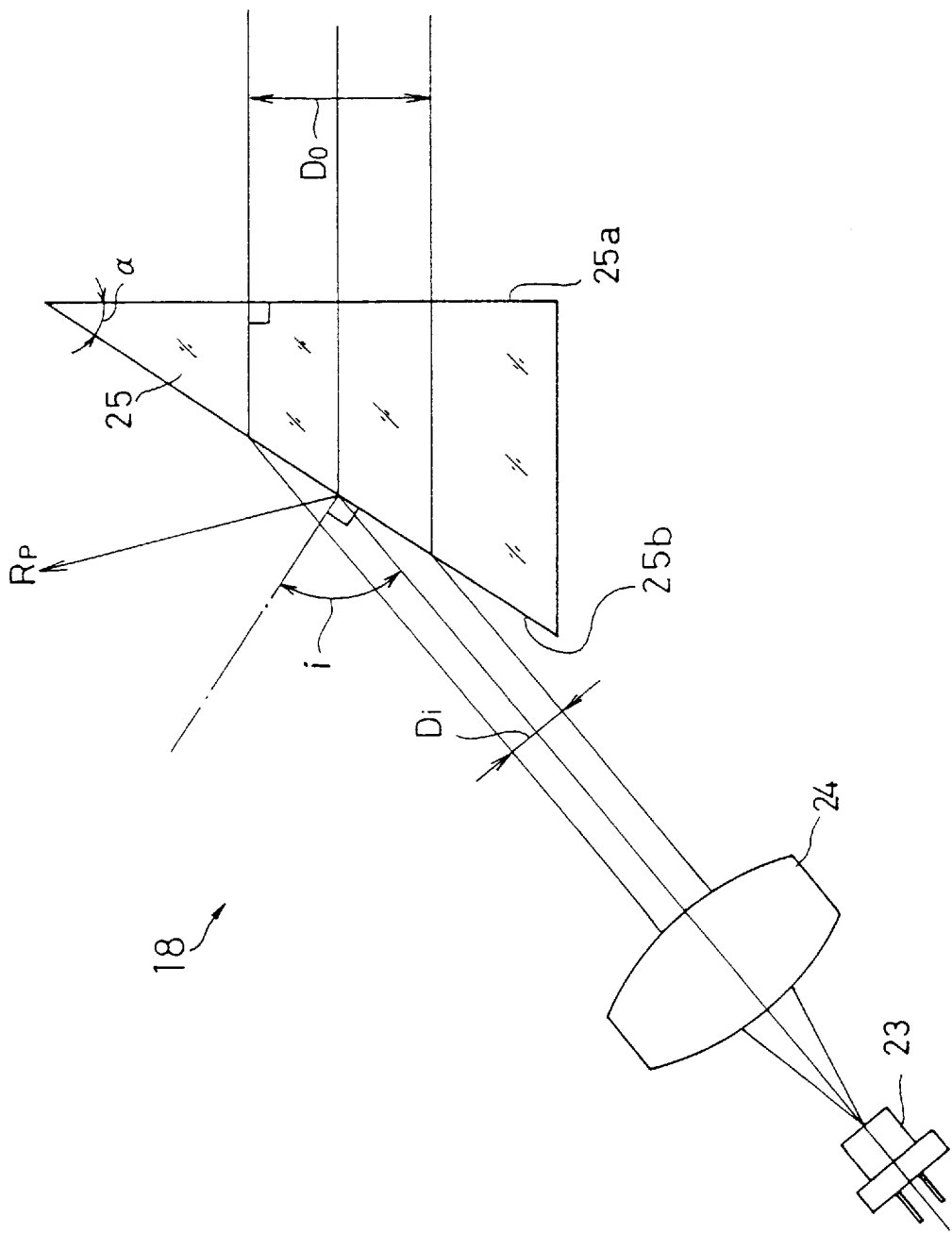
FIG. 4 is a schematic side view of a first example of a shape converting optical system for converting a sectional shape of a bundle of laser beams, which can be applied to the laser projecting apparatus shown in FIG. 1.

FIG. 4 shows a first example of the shape converting optical system 18, which includes one anamorphic prism 25 having an apex angle α and a refractive index n. The collimating lens 24, provided between the anamorphic prism 25 and the laser diode 23, has a large numerical aperture (NA) and provides a predetermined incident angle "i" of light incident upon the anamorphic prism 25.

Figure 5:
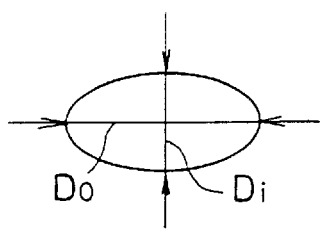
FIG. 5 is an explanatory view of a bundle of laser beams whose sectional shape is elliptical, emitted from a laser diode.
Figure 6:
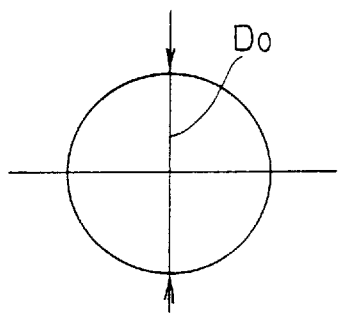
FIG. 6 is an explanatory view of a bundle of laser beams whose sectional shape has been converted to an almost circular shape by a shape converting optical system.

In the first example, a bundle of laser beams having an elliptical intensity distribution in a section normal to the direction of the path of the light emitted from the laser diode 23 is converted by the collimating lens 24 into collimated beams having an elliptical sectional shape whose minor and major axes, in the plane of the sheet of the drawing (FIG. 4), and in the plane perpendicular to the sheet of the drawing, are "Di" and "Do", respectively. When the laser beams are incident upon the anamorphic prism 25 at an incident angle "i", the minor axis "Di" (FIG. 5) is elongated to be substantially identical to the major axis "Do". The laser beams are then emitted at right angles from the emission surface 25a. Consequently, the light emitted from the emission surface 25a has a circular section whose diameter is identical to the length of the major axis "Do", as shown in FIG. 6.

There is a relationship between the minor axis "Di", the major axis "Do" and the apex angle α of the anamorphic prism 25 and it is as follows:

$$Do/Di = \cos \alpha / \cos i = \cos \alpha / (1 - n^2 \times \sin^2 \alpha)^{1/2} = m$$

wherein "m" designates the anamorphic magnification. Namely, the laser beams emitted from the anamorphic prism 25 can be converted into light having a circular section whose diameter is "Do" at the anamorphic magnification (Do/Di) which is obtained by appropriately selecting the apex angle α, the refractive index "n", and the incident angle "i".

Figure 8:
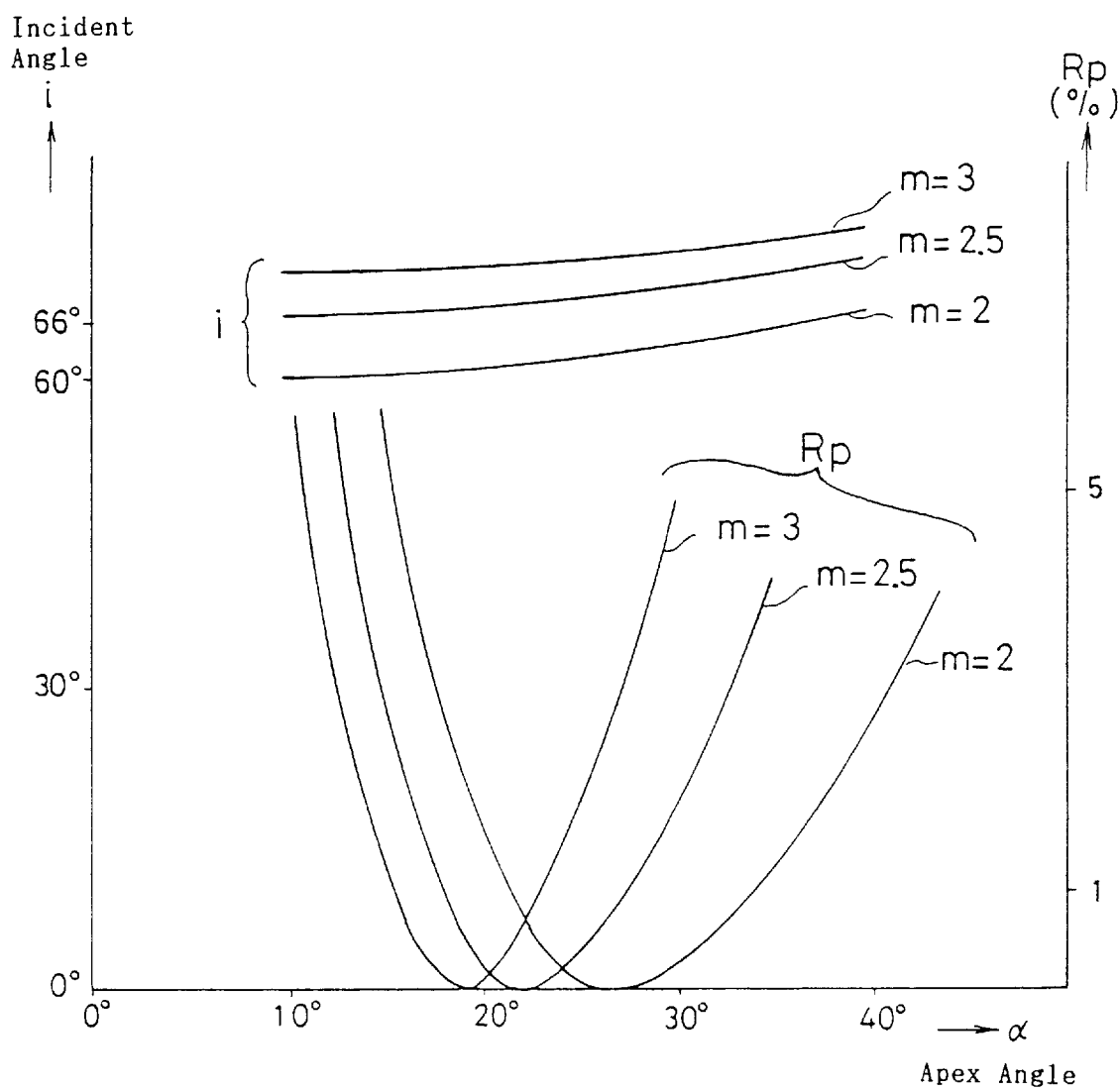
FIG. 8 is a graph representing the correlation of an incident angle, an apex angle, and the surface reflectance of an anamorphic prism.

Numerical data concerning the anamorphic prism 25 is shown in FIGS. 7 and 8. The graph shown in FIG. 7 represents the correlation between the anamorphic magnification "m" and the apex angle α. The graph shown in FIG. 8 represents the correlation between the apex angle α, the incident angle "i", and the surface reflectance "Rp", in connection with the anamorphic magnification "m" which is a parameter, respectively.

In FIG. 7, anamorphic prisms having the refractive indexes "n" of 1.5, 1.65 and 1.8 are used. It can be seen from FIG. 7 that a desired anamorphic magnification "m" can be obtained at a small apex angle α when the refractive index "n" is large. The apex angle is reduced as the refractive index is increased. For instance, in the case of an anamorphic prism whose refractive index "n" is 1.8, the anamorphic magnification "m" is 2.11 when the apex angle α is 30.5 degrees. In FIG. 8, anamorphic prisms having an anamorphic magnification "m" of 2, 2.5 and 3 are used. It can be seen from FIG. 8 that for the same apex angle α, the anamorphic magnification "m" increases as the incident angle "i" increases. Also, when the apex angle α is reduced, the greater the anamorphic magnification "m", the less surface reflectance "Rp" there is.

In general, laser beams emitted from a laser diode contain an astigmatic difference which makes it impossible to reduce the diameter of the laser beams. Consequently, no or little light can reach a far distance. To this end, in the first example (FIG. 4), the astigmatic difference of the laser beams is corrected by varying the distance between the laser diode 23 and the collimating lens 24.

Figure 9:
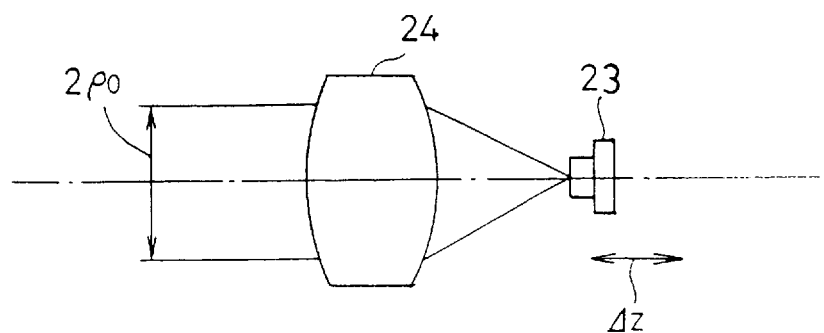
FIGS. 9, 10 and 11 are explanatory views of an optical system used to eliminate astigmatism in laser beams.
Figure 10:
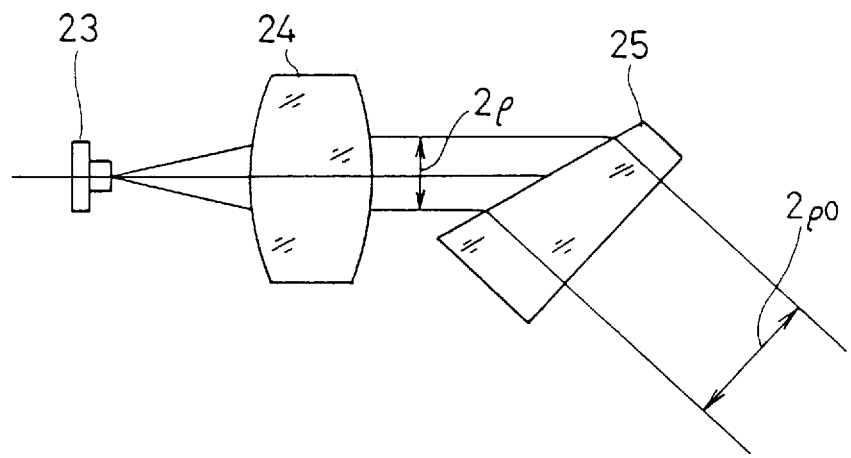
Figure 11:
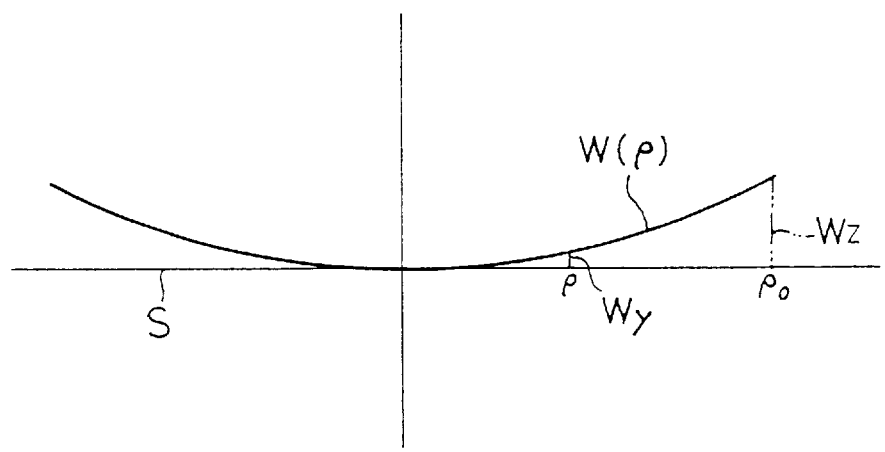

Namely, assuming that the laser beams do not have an astigmatic difference and that the distance between the collimating lens 24 and the laser diode 23 is deviated from a predetermined value, the wavefront of the light emitted from the collimating lens 24 is a curved wavefront including a certain amount of defocus as shown in FIG. 11. When the distance between the laser diode and the collimating lens is at a correct value, a planar wavefront is obtained. A bundle of laser beams emitted from laser diode 23 has an elliptical section. Namely, the diameters of the beam bundle in the two orthogonal directions are different. Consequently, on the assumption that the minor axis and the major axis of the beam bundle are $\rho$ and $\rho_0$, respectively, the deviations of the curved wavefront, from the reference wavefront "S", on the minor axis side and the major axis side are "Wy" and "Wz", respectively. When the light emitted from the collimating lens 24 passes through the anamorphic prism 25, the minor axis $\rho$ is extended to be identical to $\rho_0$, so that a light bundle with a circular section whose radius is identical to $\rho_0$ is obtained. However, since there is still a deviation "Wy" in the minor axis direction, the wavefront to be obtained has an astigmatic difference corresponding to a difference between "Wy" and "Wz" (for the same value of $\rho_0$), as shown in FIGS. 9, 10, and 11.

It is possible to change the sign of the astigmatic difference by moving the laser diode 23 (FIG. 9) relative to the collimating lens 24 by $\Delta Z$ to thereby change the distance between the laser diode 23 and the collimating lens 24, with respect to a reference distance in the negative or positive direction (increase or decrease). Namely, it is possible to produce an astigmatic difference which cancels the inherent astigmatic difference of the laser beams by controlling the direction and amount of movement of the laser diode 23 (or collimating lens 24).

In the first example, the distance between the laser diode 23 and the collimating lens 24 is varied to intentionally produce an astigmatic difference which can cancel the inherent astigmatic difference of the laser beams emitted from a semiconductor laser diode, which is caused due to the deviation "Wy" and "Wz" of the curved wavefronts, as mentioned above. Thus, a bundle of laser beams having no astigmatic difference can be obtained, wherein the optical energy is effectively utilized. A defocus component of the wavefront can be eliminated by moving the first lens group 31 (FIG. 1) relative to the second lens group 32. Consequently, the laser beams can reach into the far distance. Note that in the second and third examples which will be discussed below, exactly the same effect as that in the first example can be expected by varying the distance between the laser diode 23 and the collimating lens 24.

In connection with the foregoing, we have:

$$Wz = [\{1-(1-NA_0^2)^{1/2}\} \times \Delta Z] \approx \frac{1}{2} \times NA_0^2 \times \Delta Z$$

$$Wy = Wz \times (\rho/\rho_0)^2 = Wz \times 1/m^2$$

$$def = (Wz + Wz/m^2)/2 = Wz/2 \times (1 + 1/m^2)$$

$$As = Wz - Wz/m^2 = Wz(1 - 1/m^2)$$

wherein
  As: the astigmatic difference,
  def: the defocus,
  NA: the numerical aperture,
  m: the anamorphic magnification ($m = \rho_0/\rho$),
  Wy: the deviation of the curved wavefront from the reference wavefront "S" at $\rho$ on the minor axis side,
  Wz: the deviation of the curved wavefront from the reference wavefront "S" at $\rho_0$ on the major axis side, As mentioned above, since the shape converting optical system 18 (FIG. 2) is provided in the optical path from the laser diode (laser source) 23 to the pentagonal prism (reflecting means) 35 to convert a bundle of laser beams with an elliptical section to a bundle of laser beams with a circular section, not only can aiming be easily effected but also the detection sensitivity of the laser beams, by a sensor, can be made uniform in any direction without complicating the optical system or increasing the production cost. Moreover, since the collimating lens 24 is provided between the laser diode 23 and the shape converting optical system 18 to collimate the laser beams emitted from the laser diode 23, so that the astigmatic difference of the laser beams can be corrected by varying the distance between the laser diode 23 and the collimating lens 24, the problem of not being able to reduce the beam diameter due to the inherent astigmatic difference of the laser beams can be solved.

The operation of the laser projecting apparatus 11, constructed as above, will now be discussed.

The optical elements of the laser projecting apparatus 11 are arranged as shown in FIG. 1. In this state, when the main switch (not shown) is turned ON, the laser diode 23 oscillates and emits laser beams in accordance with control signals supplied from the microcomputer 82. The laser beams are collimated by the collimating lens 24 into a bundle of parallel beams having an elliptical section. The beams are then made incident upon the anamorphic prism 25 wherein the minor axis "Di" (FIG. 5) is extended, so that now a bundle of beams having a circular section whose diameter is "Do" is obtained, as shown in FIG. 6. The circular beams are then split into two bundles of beams $L_1$ (travelling upward) and $L_2$ (travelling downward) by the PBS 27.

In FIG. 2, if the laser beams $L_0$ incident upon the PBS 27 are linearly polarized beams of light having an S-polarized light component but having no P-polarized light component, and having an oscillation direction perpendicular to an incident plane including the line normal "$n_0$" to the PBS surface 27a and the laser beams $L_0$, the laser beams $L_0$ are totally reflected by the PBS surface 27a, so that the direction is changed by 90 degrees to travel upwards as shown in FIG. 2. Since the ¼λ plate 28 is attached to the PBS 27 such that the axial direction thereof is inclined at 45 degrees with respect to the oscillation direction of the incident beams of light, the laser beams $L_0$ are converted into circularly polarized beams of light $L_1$ when the beams $L_0$ pass through the ¼λ plate 28. The beams $L_1$ then travel toward the pentagonal prism 35. The light $L_1$ which is reflected by the semitransparent film 28a to return to the PBS surface 27a is transmitted through the ¼ λ plate 28, so that the light $L_1$ is converted into a linearly polarized light having an oscillation direction perpendicular to the oscillation direction of the incident light. Namely, the linearly polarized light having an S-polarized light component is converted to a linearly polarized light having a P-polarized light component. Consequently, the light having the P-polarized light component is transmitted through the PBS surface 27a in the downward direction as the laser beams $L_2$, and is then transmitted through the wedge-shaped prisms 29a and 29b to be projected downward and outward from the projector 11.

The light $L_1$ travelling upward is transmitted through the first lens group 31, the second lens group 32, the incident surface 35c of the pentagonal prism 35, and is then successively reflected by the first and second reflecting surfaces 35a and 35b to change direction by 90 degrees, it is then projected as light $L_3$ from the emission surface 35d in the direction perpendicular to the light $L_2$, i.e., in the horizontal direction. That light $L_1$, not reflected by the first reflecting surface 35a, is transmitted through a half mirror surface formed by the wedge-shaped prism 34 which is attached to the upper surface of the first reflecting surface 35a of the pentagonal prism 35, and is projected upward as light $L_4$, whose axis is identical to the axis of the light $L_1$. The laser beams $L_0$ thus emitted from the laser diode 23 are split into laser beams $L_1$, $L_4$ and $L_2$ which are projected upward and downward in FIG. 2, and laser beams $L_3$ which are projected in the direction perpendicular to the direction of the laser beams $L_1$, $L_4$ and $L_2$, i.e., in the horizontal direction.

In the laser projector 11 according to the present invention, since the single pentagonal prism 35 is used, no adjustment of the reflecting surface is necessary upon attachment to the projector, so long as the precision of the pentagonal prism 35 is guaranteed. Consequently, while previously an adjustment of the angle defined between the half mirror and the reflecting mirror has been necessary, it is now rendered unnecessary. Furthermore, it is ensured that light is correctly reflected. Since the emission surface 34a of the wedge-shaped prism 34 is parallel with the incident surface 35c of the pentagonal prism 35, little or no lateral displacement of the laser beams $L_4$ travelling upward occurs, and hence, unlike the prior art, no rotation of the beams takes place along a circle whose radius corresponds to the lateral deviation. Thus, the aiming operation can be simplified. Since the pentagonal prism 35 is made of a single piece provided with a plurality of reflecting surfaces, no precision is lost after long use owing to the rigidity of the pentagonal prism.

The laser diode 23 is arranged so that when the laser beams $L_0$ are emitted the S-polarized light component is made incident upon the PBS surface 27a of the PBS 27, the beams are totally reflected by the PBS surface 27a and are transmitted through the ¼ λ plate 28. Part of the laser beams transmitted through the ¼ λ plate 28 is transmitted through the semitransparent film 28a provided on the ¼ λ plate 28. The remaining part of the laser beams transmitted through the ¼ λ plate 28 is reflected by the semitransparent film 28a, then is transmitted through the ¼ λ plate 28 and is returned to the PBS 27. Consequently, the polarized light component thereof is converted into a P-polarized light component which can pass through the PBS surface 27a. The laser beams are thus transmitted through the PBS 27 to be projected as the laser beams $L_2$.

The drawbacks of the prior art, as mentioned above, can be eliminated in the laser projector 11 according to the present invention. Namely, in the known laser projector of the prior art, the laser beams emitted from the laser diode are partly reflected by the half mirror surface to project as the same towards the outside of the projector; and the remaining part of the laser beams transmitted through the half mirror surface are reflected by the reflecting mirror, provided behind the half mirror surface, to return as the same to the half mirror surface. Thus, the return light is projected in a direction diametrically opposed to the laser beams directly reflected by the half mirror surface. Therefore, a part of the beams of light is returned to the light source (laser diode), which leads to an optical energy loss. However, the laser projector according to the present invention, is free from these problems. Moreover, since all the laser beams reflected by the semitransparent film 28a are transmitted through the PBS surface 27a, no light is returned to the laser diode. Consequently, the problem that the oscillation of the laser diode 23 becomes unstable due to the light returned thereto, does not occur.

In the laser projector 11 of the present invention, when the main switch is turned ON, the rotating motor 66 is supplied with electric power to rotate at a predetermined speed. The rotation of the motor 66 is transmitted to the light emitter 15 through the pinion 67 and the transmission gear 69, so that the light emitter is rotated relative to the hollow member 21. Consequently, the direction of the laser beams $L_1$ emitted from the second lens group 32 is changed by 90 degrees by the pentagonal prism 35, and hence it is possible to continue projecting the laser beams $L_3$ while rotating the light emitter 15 in a horizontal plane. Thus, the laser beams $L_3$ having a circular section are continuously emitted at a constant level from the laser projector 11, and accordingly, a horizontal plane (horizontal reference plane) is formed. An operator can mark, for example, a column or pillar of a building, along the locus of circular laser beam spots incident thereupon.

Since the light $L_1$ transmitted through the semitransparent film 28a of the ¼ λ plate 28, has been converted to circularly polarized light, if the normal line of the first reflecting surface 35a is rotated by the pentagonal prism 35 which rotates together with the light emitter 15, the light can certainly be detected without changing the intensity thereof, regardless of the optical property of the coating layer of the first reflecting surface 35a.

If the inclination angle of the projector body 13 is adjusted or the angle of the horizontal reference plane is adjusted, a switch (not shown) is actuated to drive either the first level 44 or second level 75 adjusting motor. For example, when the first level adjusting motor 44 is driven, the rotation of the motor is transmitted to the adjusting screw 45 through the pinion 49 and the transmission gear 50. As a result, the adjusting nut 46 is moved up or down through the rotation of the adjusting screw 45. Since the operation pin 47 of the adjusting nut 46 is pressed against the roller 40 in a predetermined direction by the spring force of the tensile spring 52, the hollow member 20 can be rotated about the center of the spherical part of the bulged portion 21 through the roller 40. When the second level adjusting motor 75 is driven, the rotation of the motor is transmitted to the adjusting screw 79 through the pinion 76 and the transmission gear 77. As a result, the adjusting nut 80 is moved up or down through the rotation of the adjusting screw 79. Since the operation pin 81, of the adjusting nut 80, is pressed against the roller 41 in a predetermined direction by the spring force of the tensile spring 52, the hollow member 20 can be rotated about the center of the spherical part of the bulged portion 21 through the roller 41. The inclination angle of the hollow member 20, with respect to the horizontal direction upon emission of the laser beams, is determined by the rotation and adjustment operation mentioned above. The adjustment can be carried out manually or automatically in accordance with control signals supplied from the microcomputer 82.

To converge the laser beams onto a focal point of an object, such as a wall or pillar of a building, a switch (not shown) is turned ON to drive the lens moving motor 59. The rotation of the motor 59 is transmitted to the lens moving screw 56 through the pinion 60 and the transmission gear 61. As a result, the lens moving nut 57 is moved up or down through the rotation of the lens moving screw 56. Consequently, the slider (lens holder) 30 is moved up or down through the link 62 which is secured to the lens moving nut 57. The operator adjusts the focus while viewing the beam spot formed on an object such as a pillar or wall, etc.

A second example of the shape converting optical system 18 for converting the sectional shape of the laser beams will be explained below with reference to FIG. 12. In the second example, the optical system 18 includes anamorphic prisms 25 and 26 whose magnifications are $m_1$ and $m_2$, respectively. The anamorphic prisms 25 and 26 are arranged such that the direction of the laser beams are bent in opposite directions. The resultant anamorphic magnification "m" of the anamorphic prisms 25 and 26 is given by $m = m_1 \times m_2$. In this case, the incident laser beams can be made parallel with the emitted laser beams. If the anamorphic prisms 25 and 26 are identical in shape and are made of the same material of glass, the anamorphic magnifications $m_1$ and $m_2$ are identical (i.e. $m_1=m_2$). The use of identical anamorphic prisms 25 and 26 contributes to a simplification of the manufacturing process and a reduction in the production cost.

Figure 13:
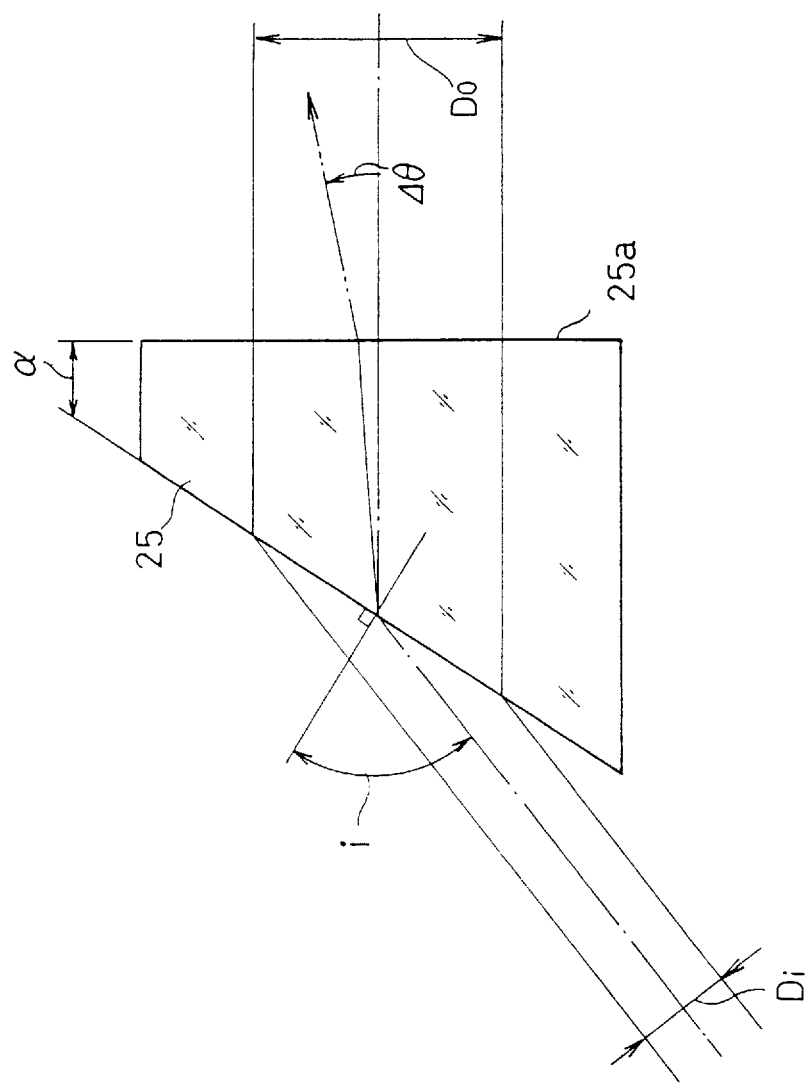
FIG. 13 is a schematic side view of an anamorphic prism to show a change in the emission angle of laser beams depending on the level of chromatic aberration.

In general, if the wavelength of the oscillation of the laser diode 23 varies in accordance with a change in conditions, such as temperature, etc., a chromatic aberration (transverse chromatic aberration) is produced by the anamorphic prisms 25 and 26, so that the emission angle of the laser beams at the emission surface 26$a$ changes by $\Delta\theta$ (FIG. 13). For instance, for visible laser light (wavelength $\lambda$=635 nm), $\Delta\theta$ is 2 nm/10°. It is very important, particularly in a laser projector in which the reference plane is formed upon surveying, to make the variation $\Delta\theta$ as small as possible. Note that it is impossible to completely eliminate the variation $\Delta\theta$ of the emission angle in connection with the chromatic aberration, even when, like in the first example, one anamorphic prism 25 is used or in the second example when two anamorphic prisms 25 and 26 made of an identical glass material are used.

In the second example, the anamorphic prisms 25 and 26 are made of glasses which cancel the chromatic aberrations and are arranged such that the laser beams are bent in opposite directions thereby. Design examples of the anamorphic prisms 25 and 26 are shown in Table 1 below. It is assumed that the desired resultant magnification "m" is nearly 4.4 (for the visible laser beams). In Table 1, the anamorphic prisms 25 and 26 are made of different glasses in Design Examples 1 and 2, and are made of an identical glass in Design Example 3 for the sake of comparison.

TABLE 1

|  | Design Examples | | |
| --- | --- | --- | --- |
|  | 1 | 2 | 3 |
| anamorphic prism 25 | | | |
| Glass | SFL03 | SF13 | BK7 |
| Apex Angle $\alpha_1$(°) | 29.28 | 30.84 | 37.70 |
| Reflectance Rp (%) | 0.17 | 0.16 | 2.61 |
| anamorphic prism 26 | | | |
| Glass | LAK8 | BK7 | BK7 |
| Apex Angle $\alpha_2$(°) | 32.71 | 38.48 | 37.70 |
| Reflectance Rp (%) | 1.58 | 4.59 | 2.61 |
| Magnification | 4.395 | 4.390 | 4.400 |
| Lateral Chromatic Aberration (second/10 nm) | 0.5 | 0.79 | 28.87 |

In Design Examples 1, 2 and 3, magnification is determined in accordance with the incident angle, the apex angle, and the refractive index, and the chromatic aberration is determined in accordance with the Abbe number of the anamorphic prism 25 and the Abbe number of the anamorphic prism 26. Namely, if the glass material is selected to meet the following formula (1), the chromatic aberrations can be corrected:

$$\nu_2/\nu_1 > 1.8, \text{ wherein } \nu_2 > \nu_1 \qquad (1)$$

wherein $\nu_1$ designates the Abbe number of the anamorphic prism 25, and $\nu_2$ designates the Abbe number of the anamorphic prism 26, respectively.

The apex angles $\alpha_1$ and $\alpha_2$ are angles at which the parallel laser beams incident upon the anamorphic prism are emitted from the emission surface at right angles with respect to the emission surface. In the second example shown in FIG. 12, the laser beams can be made incident upon the PBS 27 by appropriately setting the direction of the apex angles $\alpha_1$ and $\alpha_2$ of the anamorphic prisms 25 and 26 without changing the direction of the laser beams emitted from the laser diode 23. Consequently, the optical elements can be compactly housed in the projector.

Figure 12:
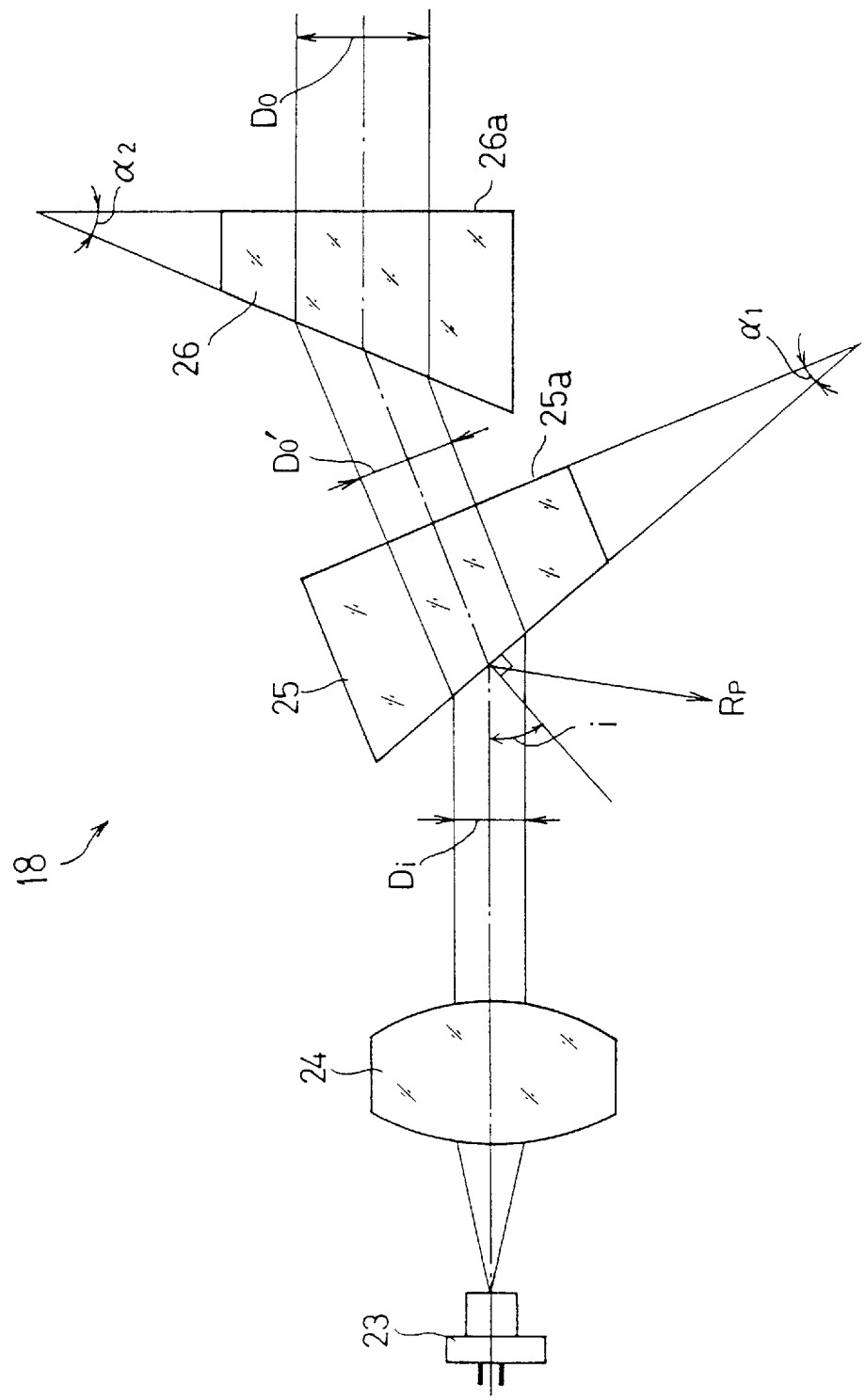
FIG. 12 is a schematic side view of a second example of a shape converting optical system for converting a sectional shape of a bundle of laser beams, which can be applied to the laser projecting apparatus shown in FIG. 1.
Figure 14:
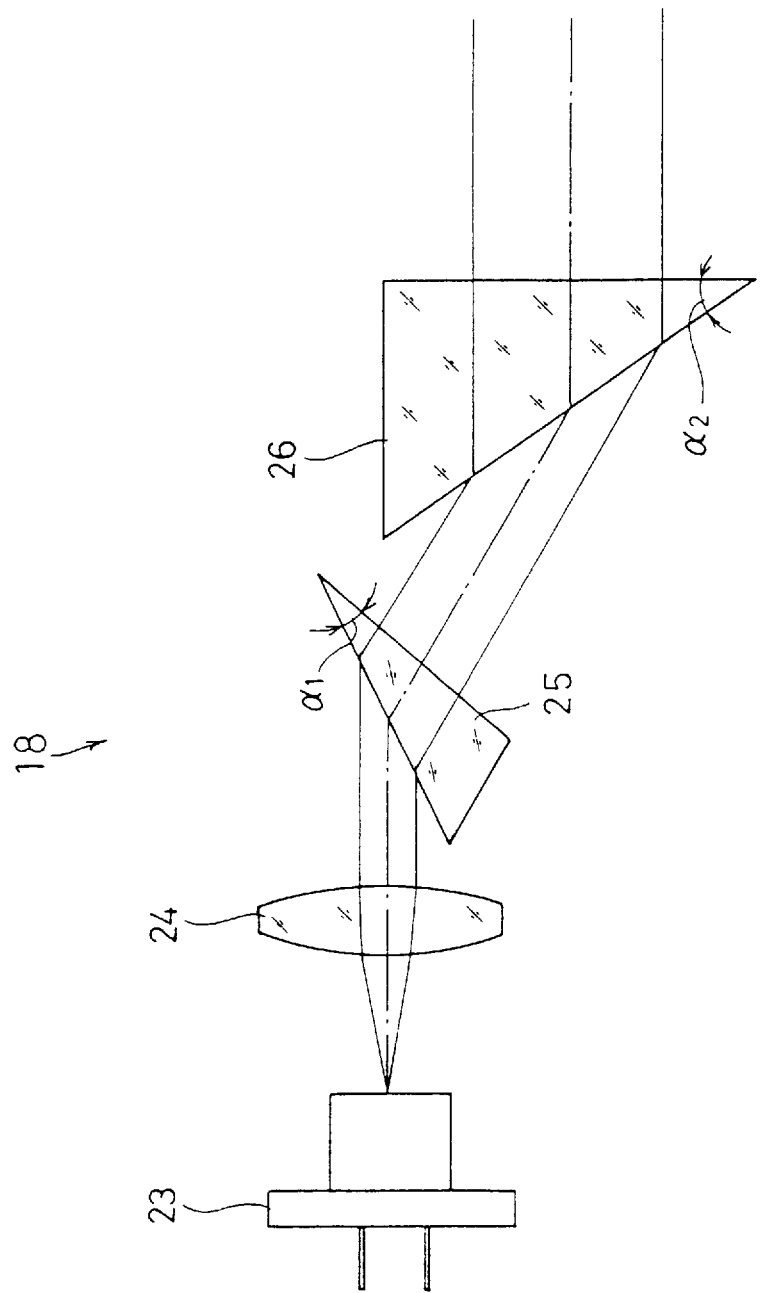
FIG. 14 is a schematic side view of a third example of a shape converting optical system for converting a sectional shape of a bundle of laser beams, which can be applied to the laser projecting apparatus shown in FIG. 1.

It is also possible to provide the anamorphic prisms 25 and 26 such that the apexes (apex angles $\alpha_1$ and $\alpha_2$) thereof are oriented opposite to the arrangement of those in FIG. 12, as shown in FIG. 14. Similar to the second example, in the third example shown in FIG. 14, the laser beams can be made incident upon the PBS 27 without changing the direction of the laser beams emitted from the laser diode 23. Consequently, the optical elements can be compactly housed in the projector.

Figure 15:
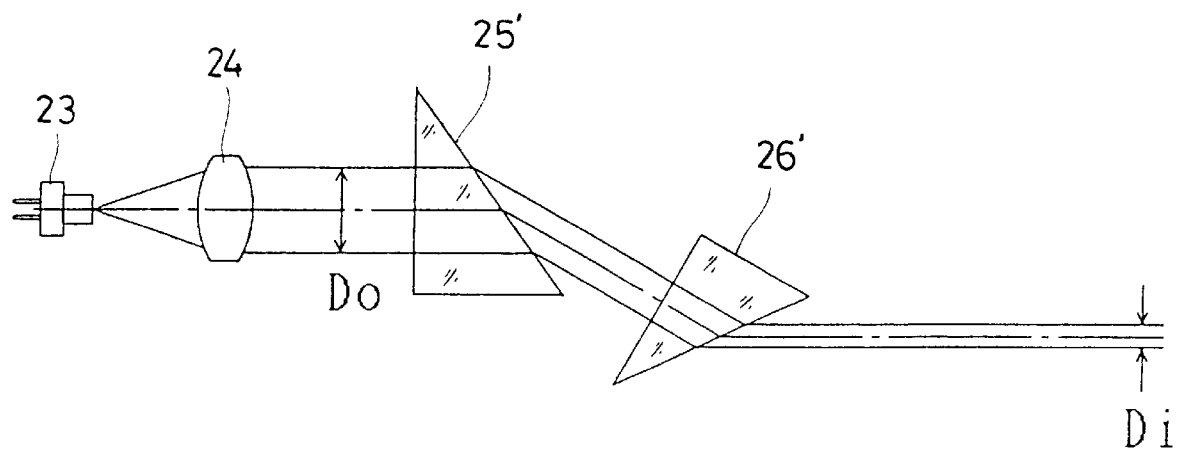
FIG. 15 is a schematic side view of a fourth example of a shape converting optical system for converting a sectional shape of a bundle of laser beams, which can be applied to the laser projecting apparatus shown in FIG. 1.

In the first, second and third examples mentioned above, the elliptical section of the laser beams is converted into a circular section by the shape converting optical system 18, which extends the minor axis "Di" of the ellipse. However, the shape converting optical system 18 is not limited to that shown in the illustrated embodiments. Namely, as in a fourth example shown in FIG. 15, the anamorphic prisms 25' and 26' are provided to reduce the major axis "Do" of the elliptical section of the laser beams, so that a circular section whose diameter is identical to the minor axis "Di" can be obtained.

Figure 16:
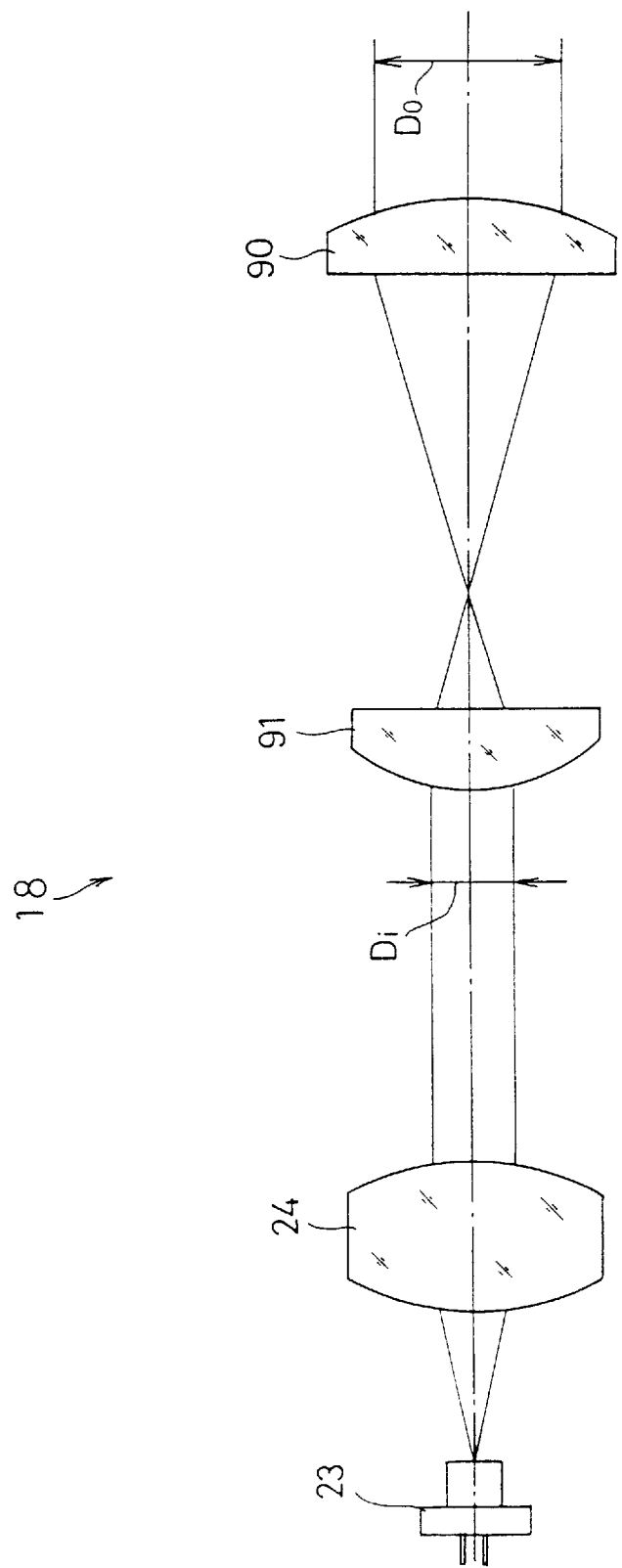
FIG. 16 is a schematic side view of a fifth example of a shape converting optical system for converting a sectional shape of a bundle of laser beams, which can be applied to the laser projecting apparatus shown in FIG. 1.

Although the sectional shape of the beam bundle is converted from an ellipse to a circle by the anamorphic prism(s) in the first, second and third examples, the anamorphic prism can be replaced with a cylindrical lens as in the fifth example, shown in FIG. 16. Here, the collimating lens 24, the first cylindrical lens 91 whose focal length is $f_1$ and the second cylindrical lens 90 whose focal length is $f_2$ are arranged in this order from the laser diode 23. The cylindrical lenses 90 and 91 have a positive power and between them, they share the same focal point. Consequently, one of, either the minor axis or the major axis of the laser beams, emitted from the collimating lens 24, is extended or shortened by the selection of the focal length of the cylindrical lenses. Namely, focal lengths $f_1$ and $f_2$ are selected to meet the following formula for the desired anamorphic magnification "m":

$$m = Do/Di = |f_2/f_1|$$

For example, the minor axis of the elliptical section of the laser beams, emitted from the collimating lens 24, is extended to obtain a nearly circular section of the laser beams.

Figure 17:
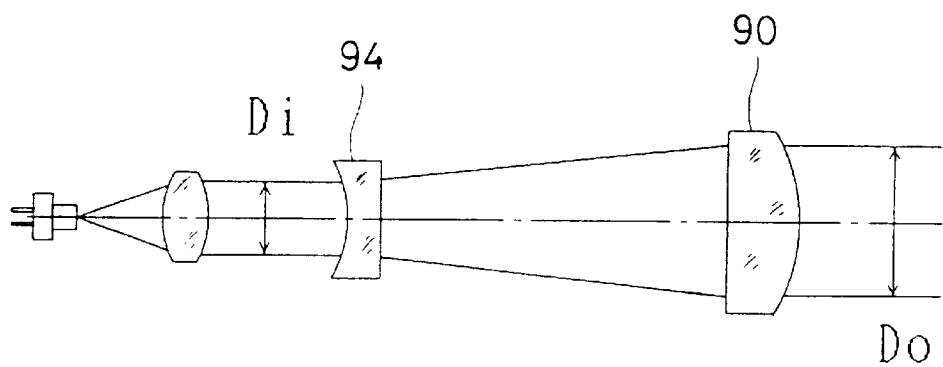
FIG. 17 is a schematic side view of a sixth example of a shape converting optical system for converting a sectional shape of a bundle of laser beams, which can be applied to the laser projecting apparatus shown in FIG. 1.

In a sixth example shown in FIG. 17, the cylindrical lens 91 is replaced with a cylindrical lens 94 having a negative power. In this example, similarly to the fifth example, the elliptical section of the laser beams is converted into a nearly circular section, without using the anamorphic prism.

Figure 20:
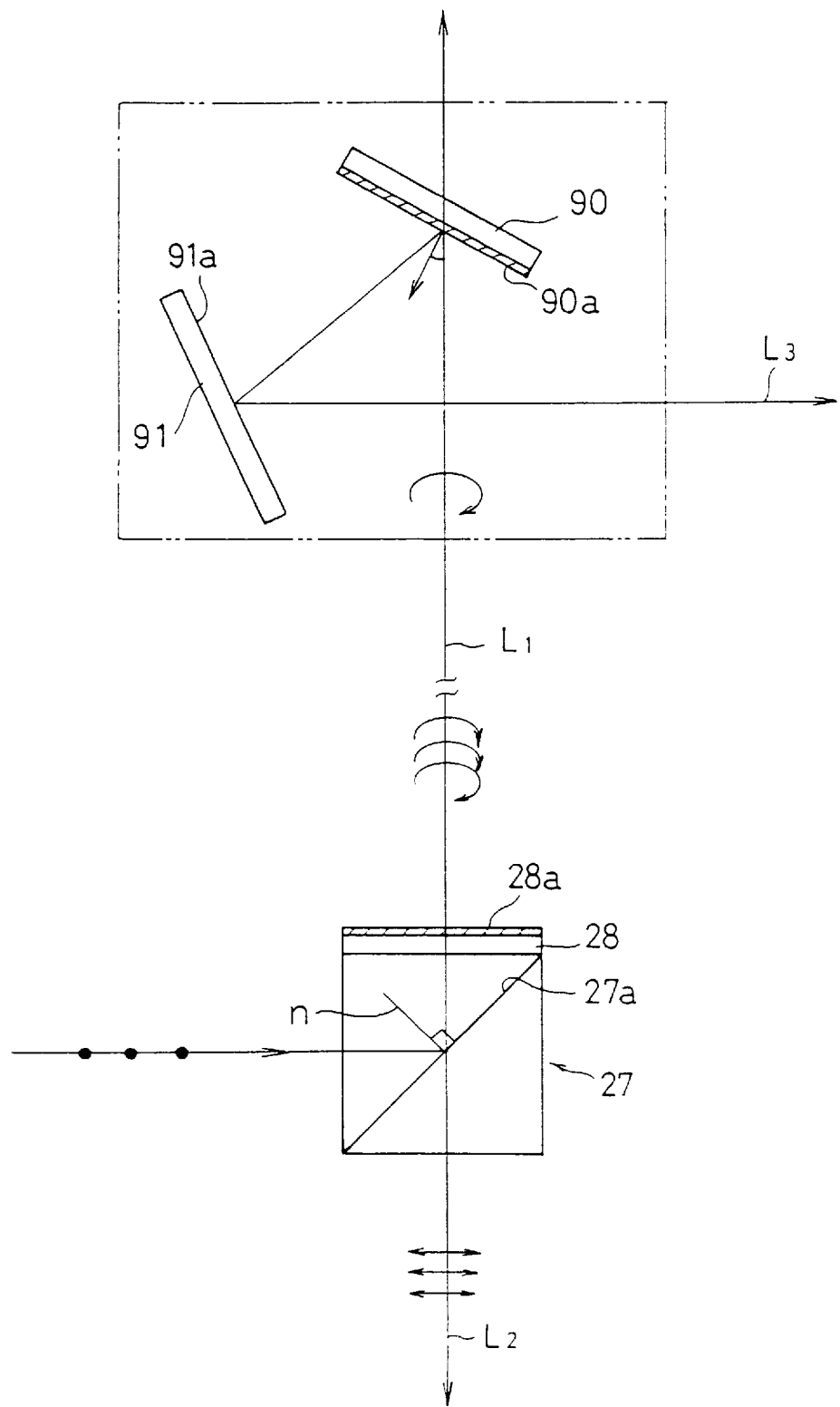
FIG. 20 is a schematic side view of an optical system in which two mirrors are used as a reflecting means, in place of a pentagonal prism.

It is possible to use two mirrors in place of the pentagonal prism 35 to fulfill the same function as the pentagonal prism. This is shown in FIG. 20. A half mirror 90 having a half mirror surface 90$a$ corresponding to the first reflecting surface 35$a$ of the pentagonal prism 35 and a mirror 91 having a reflecting surface 91$a$ corresponding to the second reflecting surface 35$b$ are provided in the pentagonal prism receiving portion 15$b$ of the rotatable light emitter 15, so that the half mirror surface 90$a$ and the reflecting surface 91$a$ define therebetween an angle of 45 degrees. Consequently, the laser beams $L_1$ travelling upward are successively reflected by the half mirror surface 90$a$ of the half mirror 90 and the reflecting surface 91a of the mirror 91 to deflect the laser beams by 90 degrees, so that the laser beams $L_3$ can be projected in a direction perpendicular to the direction of the laser beams $L_2$. A part of those laser beams $L_1$ that are transmitted through the half mirror 90, without being reflected by the half mirror surface 90a are projected upward. Note that the surface of the half mirror 90 opposite to the half mirror surface 90a is coated with an anti-reflection layer.

Figure 21:
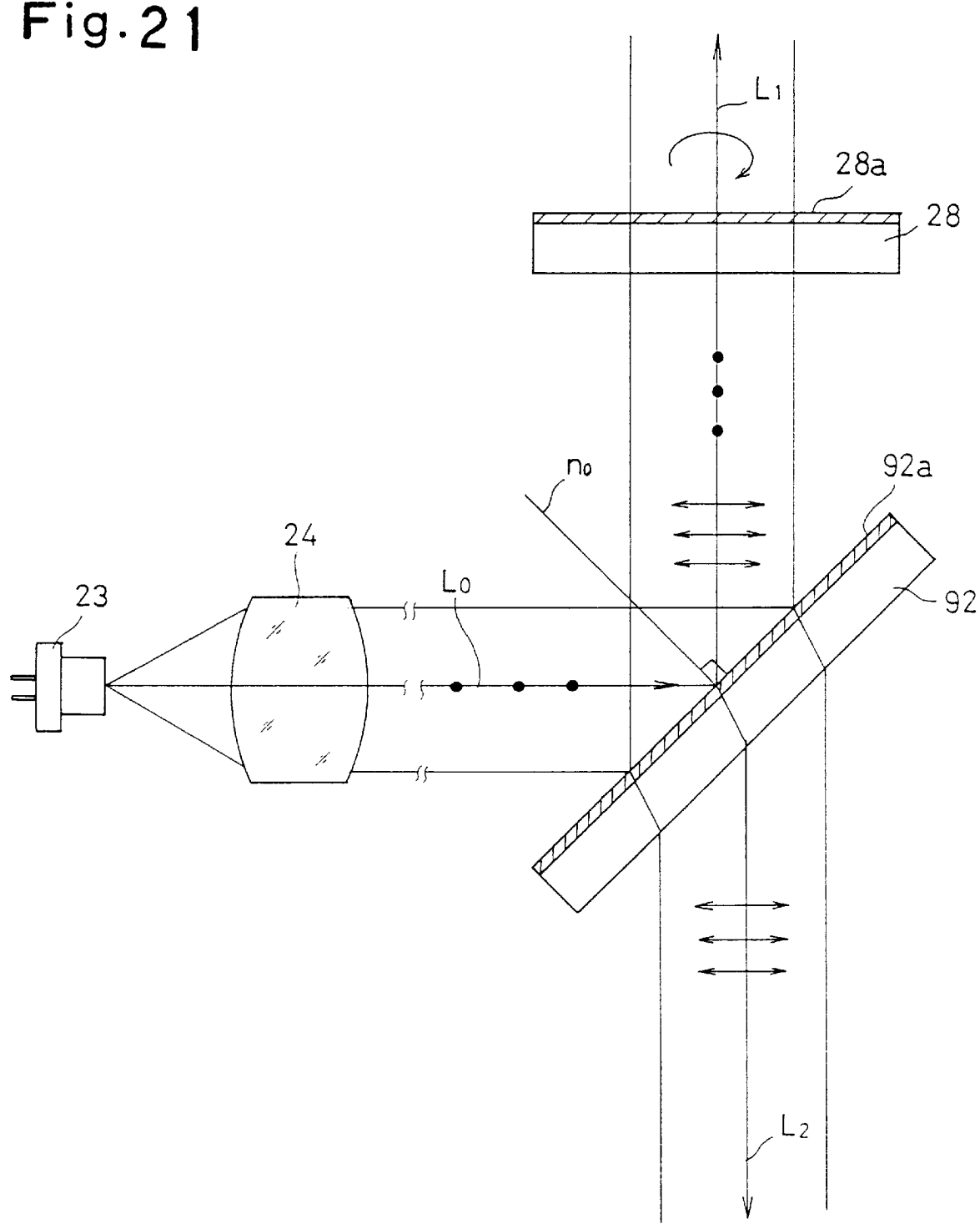
FIG. 21 is a schematic side view of an optical system in which a half mirror is used in place of a polarization beam splitter.
Figure 22:
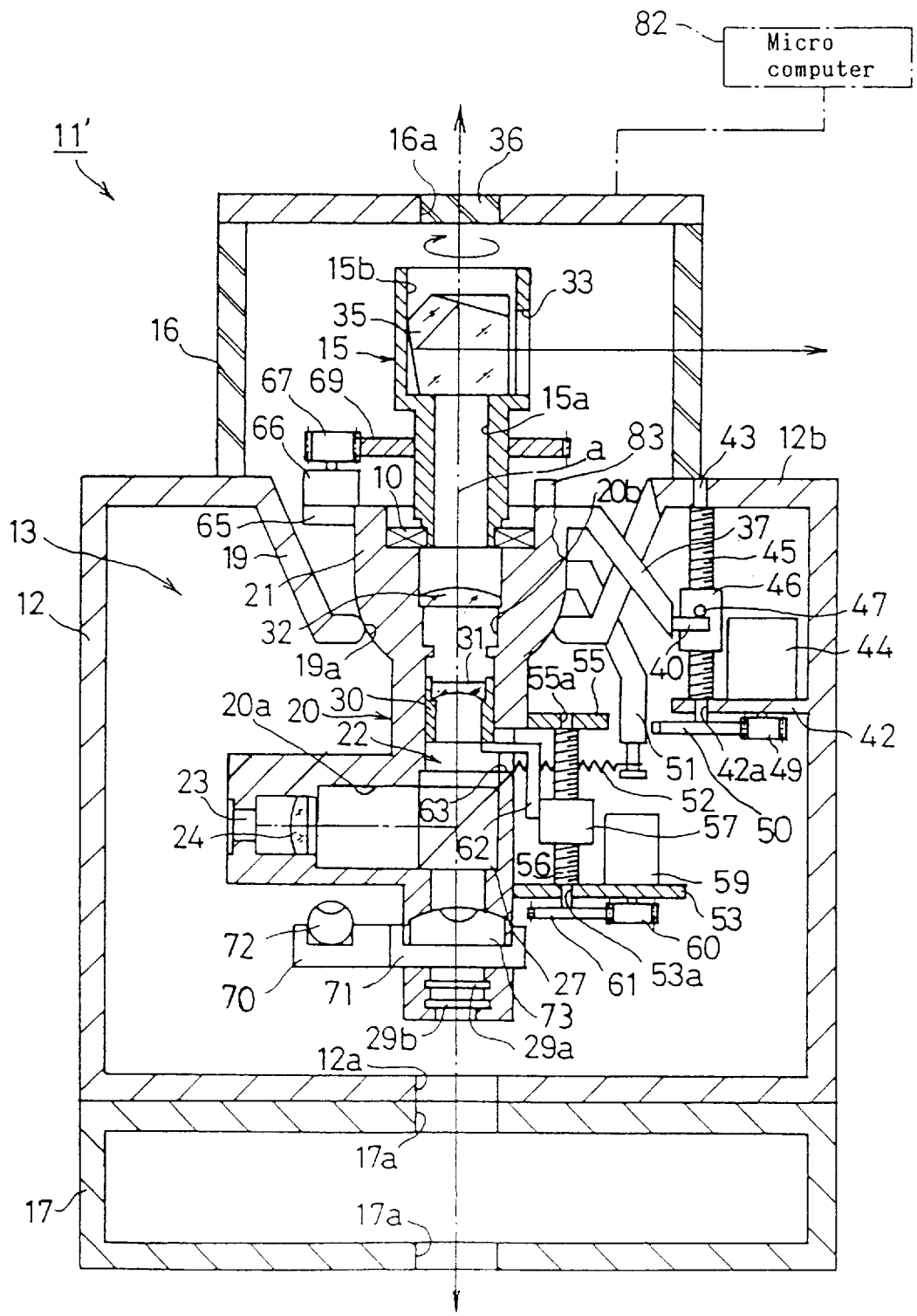
FIG. 22 is a sectional view of a laser projecting apparatus according to a second embodiment of the present invention.

A polarization beam splitter made of one plate and a ¼ λ plate can be used in place of the PBS 27 to fulfill he same optical function as the PBS 27. Namely, as shown in FIG. 21, a polarization beam splitter (PBS) 92 which is provided with a polarization beam splitting surface (PBS surface) 92a inclined at an angle of 45 degrees, with respect to the optical axis of the shape converting optical system 18 located in front of the collimating lens 24, is provided at an intersecting point along the optical paths 20a and 20b. Also, a ¼ λ plate 28 having a semitransparent film 28a is provided perpendicularly to the laser beams $L_1$ reflected by the PBS surface 92a.

Thus, if the light $L_0$ incident through the shape converting optical system 18 is linearly polarized light having an S-polarized light component perpendicular to the incident surface including the normal line "$n_0$" of the PBS surface 92a and the laser light $L_0$, the latter is totally reflected by the PBS surface 92a towards an upward direction in FIG. 21. When the light $L_0$ passes through the ¼ λ plate 28, it is converted to circularly polarized light $L_1$ which travels toward the pentagonal prism 35. Since the light $L_1$ transmitted through the semitransparent film 28a of the ¼λ plate 28, has been converted to circularly polarized light, if the normal line of the first reflecting surface 35a is rotated by the pentagonal prism 35 which rotates together with the light emitter 15, the light can certainly be detected without changing the intensity thereof, regardless of the optical property of the coating layer of the first reflecting surface 35a. When that light reflected by the semitransparent film 28a has returned to the PBS surface 92a it again passes through the ¼ λ plate 28, the circularly polarized light is converted to linearly polarized light having a P-polarized light component, and hence, the light is transmitted through the PBS surface 92a and is projected downward as the laser beams $L_2$.

The second embodiment of the present invention will be discussed below with reference to FIGS. 22 through 45.

The laser projector 11' is substantially the same as the laser projector 11 in the first embodiment, except for an absence of the shape converting optical system 18 between the collimating lens 24 and the PBS 27.

When the laser projector 11' is used, it is set at a predetermined position using a tripod. In general, the axis of the rotatable light emitter 15 (rotation axis "a") is not identical to the vertical axis and the level detecting sensors 72 and 73 are not in the horizontal state, before the adjustment is effected. In this state, if a switch (not shown) is turned ON, the microcomputer 82 drives the first and second level adjusting motors 44 and 75 in accordance with the calculated angular deviation to tilt the projector body 13 (light emitter 15) with respect to the vertical axis. When the adjustment proceeds, the detection signals from the sensors 72 and 73 represent the horizontal reference at which the angular deviation is zero. Consequently, the position of the light emitter 15 in the horizontal direction is determined in accordance with the inclination adjustment.

When the inclination adjustment is completed, the microcomputer 82 issues the drive signal to cause the laser diode 23 to commence oscillation. Consequently, the light (laser beams) emitted from the laser diode is collimated, by the collimating lens 24 into parallel beams of light having an elliptical section. Thereafter, the collimated light is split by the PBS 27 into two beams of light $L_1$ and $L_2$ travelling upwardly and downwardly, respectively. The light $L_1$ is deflected by 90 degrees by the pentagonal prism 35 and projected in the substantially horizontal direction. When the light emitter 15 begins rotating about the axis "a", the light $L_3$ projected in the horizontal direction defines a horizontal reference plane.

The collimated laser beams $L_3$, emitted from the rotating light emitter 15, are diverged due to diffraction and are no longer parallel beams. To this end, in a laser projector in which laser beams are projected into the far distance, it is necessary to provide a means for bringing a beam waist to an appropriate position by weak convergent light having a large diameter emitted from the laser diode in accordance with the need for a reachable distance. In this case, if the beam waist is deviated from a predetermined position, due to a change in the power of the lenses (first and second lens groups 31, 32, etc.) which is caused by the change in the wavelength of the laser beams emitted from the laser diode 23, or if a precise measurement at a close distance is required, an adjustment in the position of the beam waist (focus adjustment) or making the beam spot as small as possible, is necessary.

In the laser projector 11' according to the present invention, focusing can be easily carried out as in the laser projector 11, a deviation upon focusing is restricted, and an optical system used for the focusing operation is made small.

Namely, in the laser projector 111, the cylindrical member 30 is moved up and down through the feed screw mechanism by driving the lens moving motor 59, so that the first lens group 31 is moved relative to the second lens group 32 to vary the distance (relative position) therebetween. Consequently, the laser beams collimated by the collimating lens 24 are expanded in the beam diameter and made incident upon the pentagonal prism 35. Thus, the beam waist of the light $L_3$ emitted outward from the rotating light emitter 15 is brought to an optimum position, and focusing can be easily effected. Therefore, the laser projector can be effectively and advantageously used outdoors or elsewhere for that matter.

Figure 23:
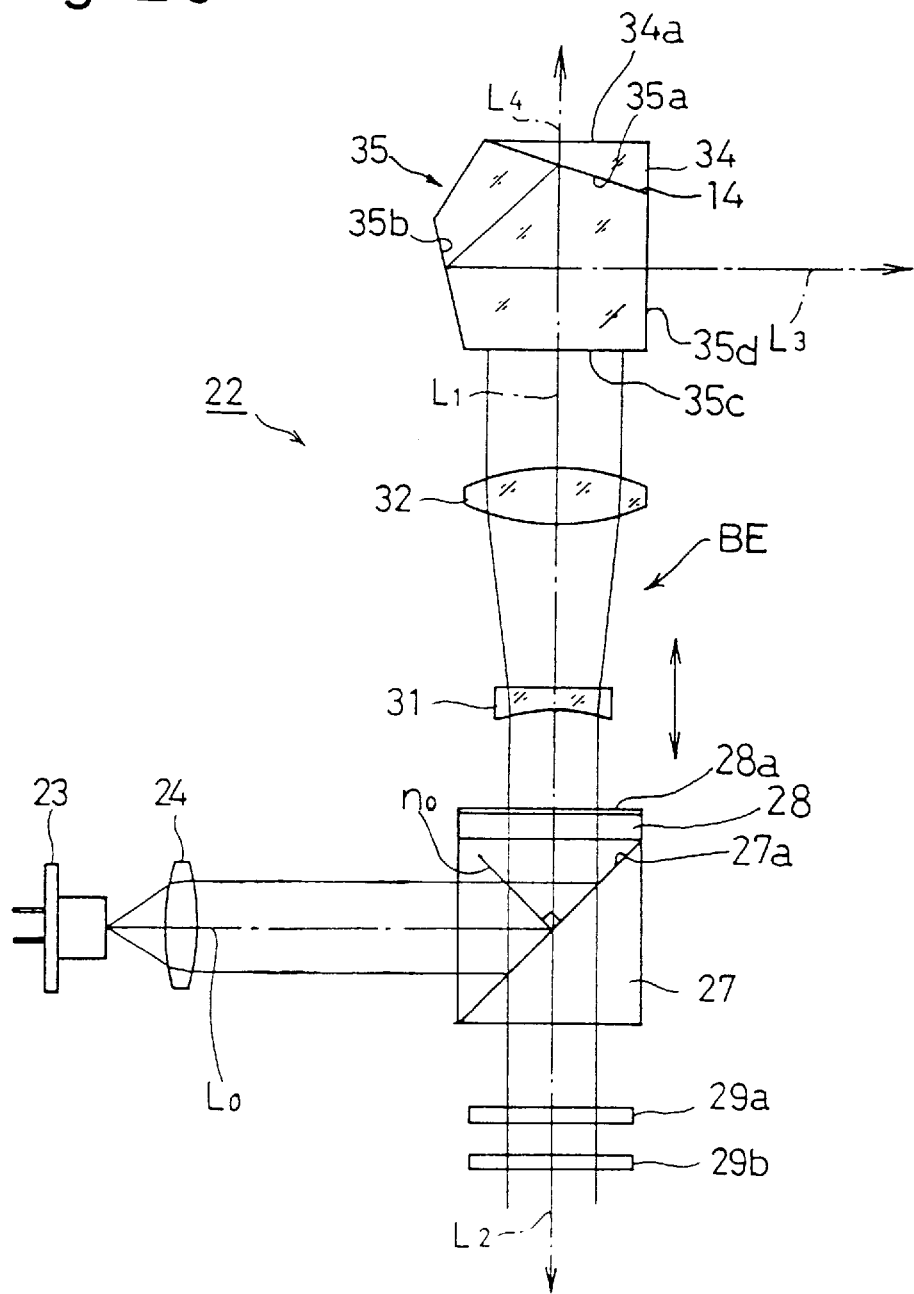
FIG. 23 is an enlarged schematic view of the main components of the laser projecting apparatus shown in FIG. 21.

Since the beam expander BE, in FIG.23, including the first lens group 31 and the second lens group 32, is constituted by a simple and small optical system in which there is no reflecting member between the lens groups and the distance between the lens groups can be varied in the same optical path, no or little deviation (tilting) occurs upon focusing. Moreover, the optical arrangement is little effected by a failure to align the optical axes of the lenses or by an inclination of the lenses upon assembly. Furthermore, since the second lens group 32, secured to the optical path closer to the pentagonal prism 35 than the first lens group 31, has a positive power, and the first lens group 31, located closer to the collimating lens 24 than the second lens group 32, has a negative power, the diameter of the first lens group 31 can be reduced to be smaller than the diameter of the beam bundle. Consequently, when the first lens group 31 is moved relative to the second lens group 32, the burden on the lens moving motor can be reduced, and hence, the driving means can be realized by a small motor 59.

The collimating lens 24 and the beam expander BE, in the laser projector 11' will be discussed below in more detail.

Figure 24:
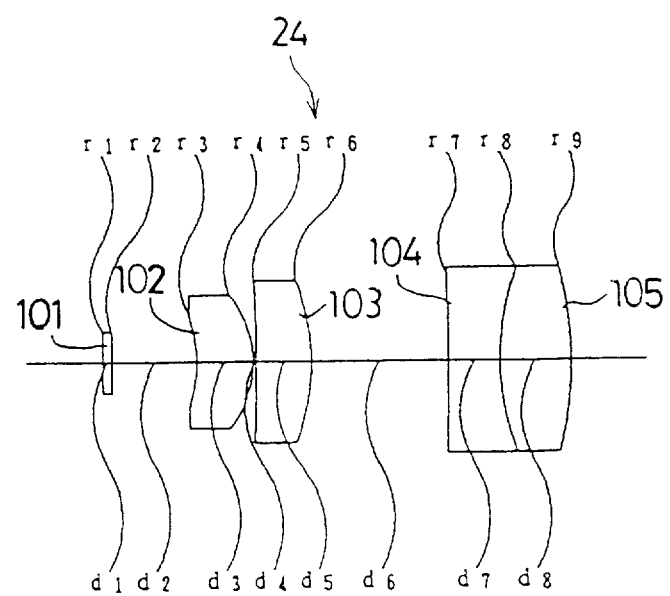
FIG. 24 is a schematic view of a lens arrangement of a collimating lens which can be applied to the laser projecting apparatus shown in FIG. 22.

FIG. 24 shows a lens arrangement of the collimating lens 24 by way of example.

The collimating lens 24 is comprised of lenses 102, 103, 104, and 105, and has a focal length of 6 mm. The glass cover 101 is associated with the laser diode 23. The lenses 104 and 105 are cemented to each other. In the drawing, $r_1$ through $r_9$ designates the radius of curvature of the glass cover or lens surfaces, and $d_1$ through $d_8$ designates the thickness of the glass cover or the lens thickness or the distance between the adjacent lenses, respectively.

Numerical data regarding the collimating lens 24 is shown in Table 2 below. In Table 2, "Ri" designates the radius of curvature of the i-th lens surface from the light source side, "Di" the thickness of the i-th glass cover or the lens or the distance between the lenses from the light source side, "n" the refractive index of the lens at a wavelength of 635 nm, and v the Abbe number of the lens at the d-line, respectively.

TABLE 2

| curvature No. | Ri | Di | n | v |
|---|---|---|---|---|
| 1 | ∞ | 0.30 | 1.51455 | 64.1 |
| 2 | ∞ | 2.73 | | |
| 3 | −4.624 | 1.80 | 1.72623 | 54.7 |
| 4 | −3.519 | 0.10 | | |
| 5 | −75.123 | 1.80 | 1.69065 | 53.2 |
| 6 | −7.118 | 4.38 | | |
| 7 | −105.190 | 1.60 | 1.83928 | 23.9 |
| 8 | 8.483 | 2.25 | 1.61586 | 63.4 |
| 9 | −13.310 | — | | |

Figure 25:
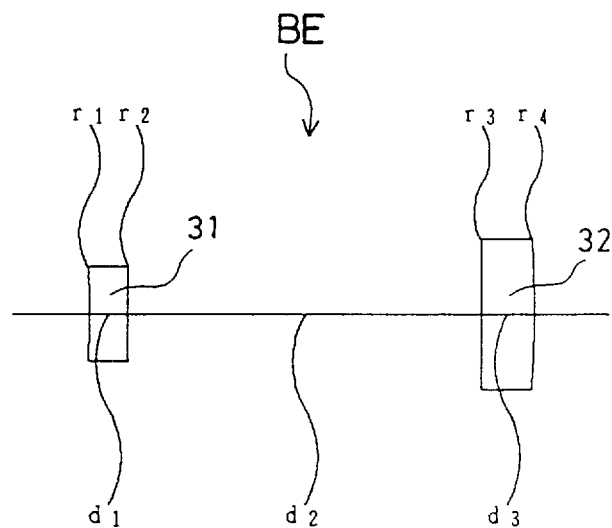
FIG. 25 is a schematic view of a lens arrangement of a first example of a beam expander which can be applied to a laser projecting apparatus.

FIG. 25 shows a first example of a lens arrangement of the beam expander BE.

The beam expander BE is comprised of a first lens group 31 made of a single lens and a second lens group 32, also made of a single lens. The magnification of the beam expander BE is 1.3.

Figure 26:
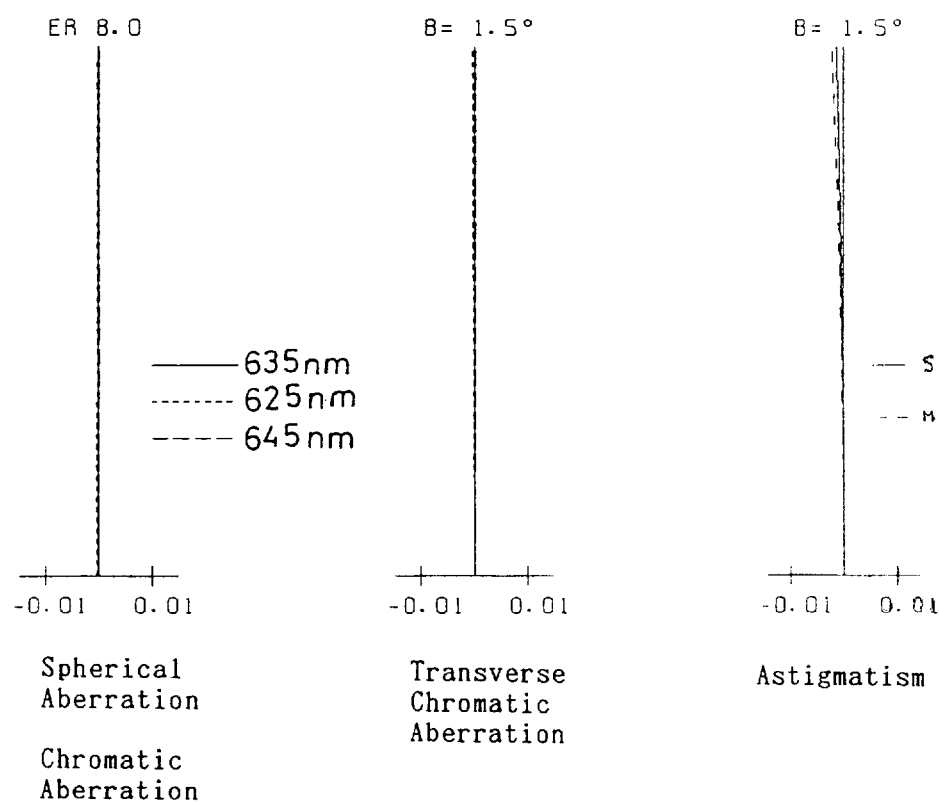
FIG. 26 is a diagram showing longitudinal aberrations in the beam expander shown in FIG. 25.
Figure 27:
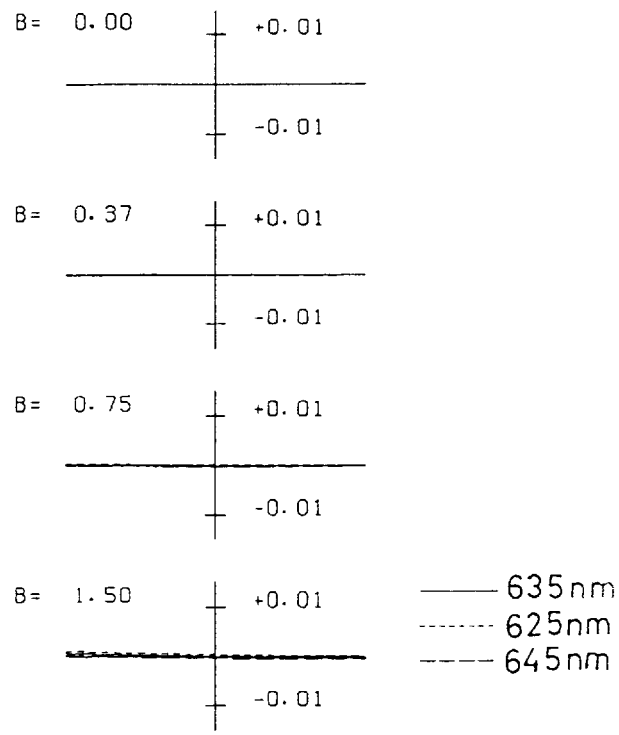
FIG. 27 is a diagram showing lateral aberrations of the beam expander shown in FIG. 25.
Figure 28:
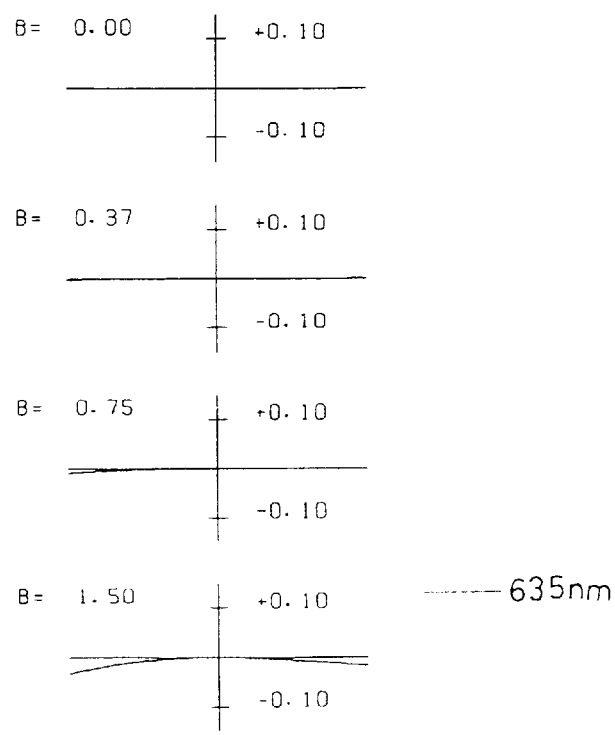
FIG. 28 is a diagram showing wavefront aberrations of the beam expander shown in FIG. 25.

Numerical data regarding the beam expander BE is shown in Table 3 below. The longitudinal aberrations, the lateral aberrations and the wavefront aberrations are shown in FIGS. 26 through 28, respectively. The aberrations are those on the image forming surface when light is incident thereon from the left side in FIG. 25. In the drawings, "ER" designates the height (in mm) of the entrance pupil, "B" the incident angle, "S" the sagittal direction, and "M" the meridional direction, respectively.

In Table 3, "Ri" designates the radius of curvature of the i-th lens surface from the left side in FIG. 25, "Di" the thickness of the i-th glass cover or the lens or the distance between the lenses from the light source side, "n" the refractive index of the lens at a wavelength of 635 nm, and v the Abbe number of the lens at the d-line, respectively.

TABLE 3

| curvature No. | Ri | Di | n | v |
|---|---|---|---|---|
| 1 | −59.000 | 2.50 | 1.60003 | 38.0 |
| 2 | 237.849 | 23.09 | | |
| 3 | ∞ | 3.50 | 1.69065 | 53.2 |
| 4 | −72.480 | — | | |

Figure 29:
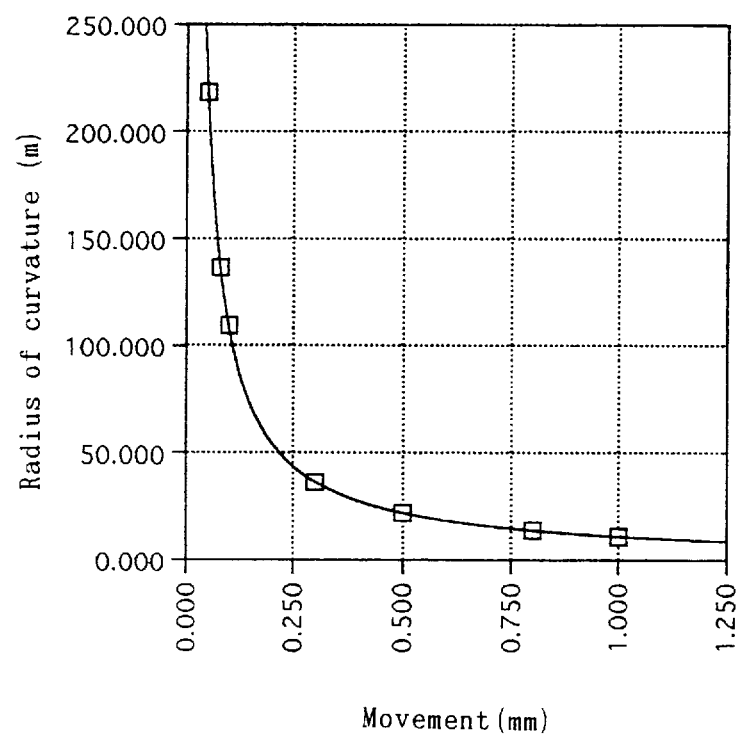
FIG. 29 is a graph showing a correlation between the displacement of the first lens, of the beam expander shown in FIG. 25, and a radius of curvature of a wavefront of laser beams to be emitted.

FIG. 29 shows a change in the (geometrically obtained) radius of curvature of the wavefront of the laser beams when the first lens group 31 is moved away from the second lens group 32 in the example of the beam expander BE shown in FIGS. 25 through 28. It can be seen from the curve shown in FIG. 29 that there is a considerable change in the radius of curvature when the movement of the first lens group 31 takes place, thus showing a high sensitivity to the movement. From this, it can be understood that in the beam expander BE, the position of the beam waist can be precisely adjusted by only a slight movement of the first lens group 31 which forms a focusing lens group. Thus, the optical system can be miniaturized.

Although the first lens group 31 is moved relative to the stationary second lens group 32 in the second embodiment, similarly to the first embodiment, the invention is not limited to this arrangement. Namely, it is possible to fix the first lens group 31 to the inner wall of the optical path 20b and move the second lens group 32 relative to the first lens group 31. In this alternative, a lens holder (slidable cylinder) corresponding to the cylindrical lens holder 30 is slidably provided in the optical path 20b, so that the second lens group 32 is held by the lens holder. The curve representing the change in the radius of curvature when the second lens group 32 is moved relative to the stationary first lens group 31 is similar to that in FIG. 29.

Figure 30:
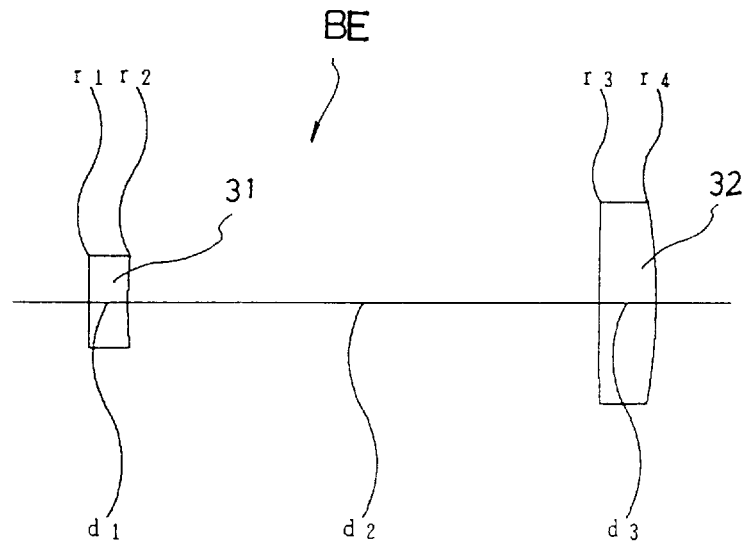
FIG. 30 is a schematic view of a second example of a lens arrangement of a beam expander which can be applied to a laser projecting apparatus.

FIG. 30 shows a second example of the beam expander BE. The beam expander is comprised of a first lens group 31 made of a single lens and a second lens group 32, also made of a single lens. The magnification of the beam expander is 1.80.

Figure 31:
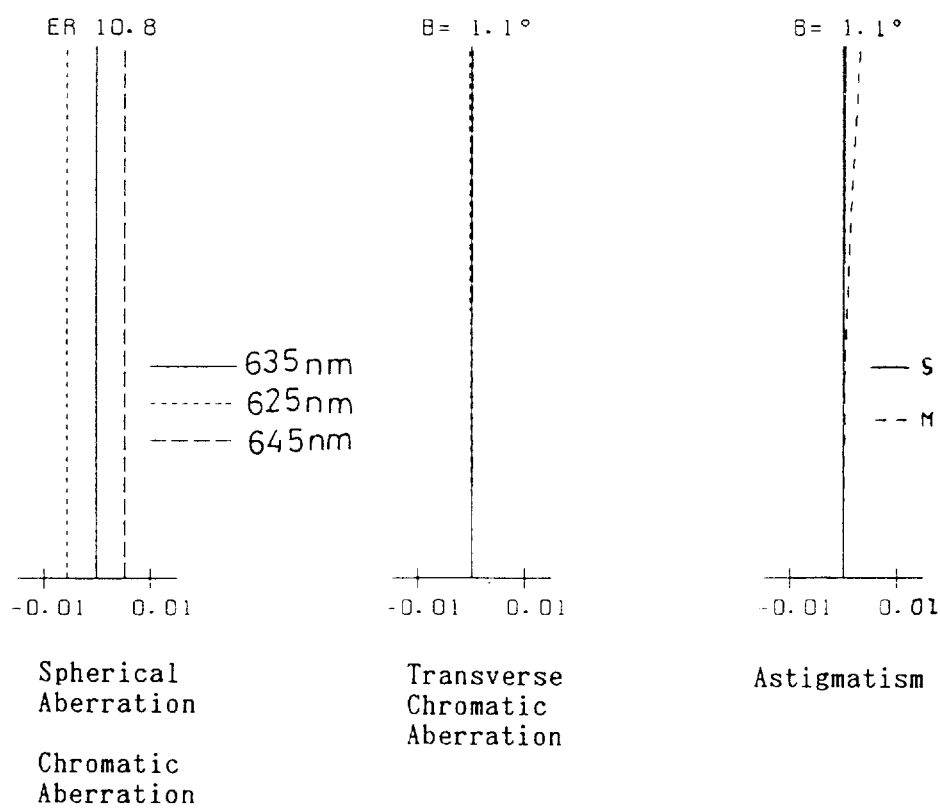
FIG. 31 is a diagram showing longitudinal aberrations of the beam expander shown in FIG. 30.
Figure 32:
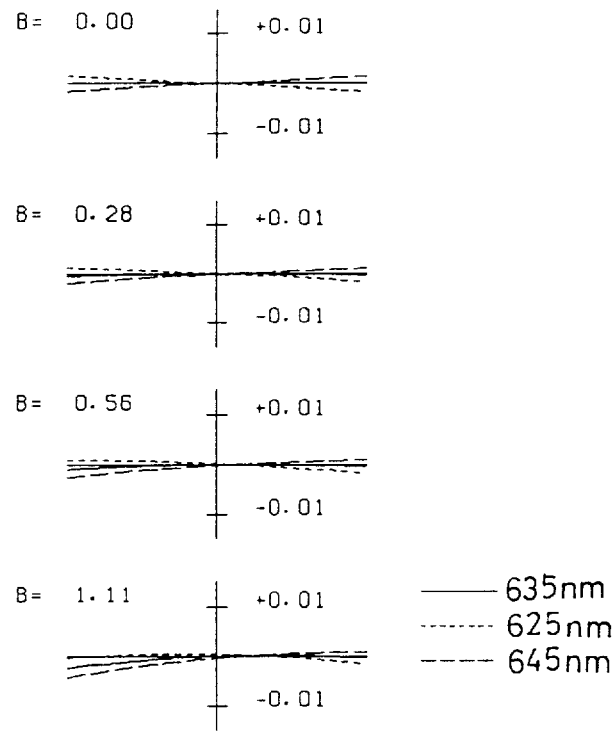
FIG. 32 is a diagram showing lateral aberrations of the beam expander shown in FIG. 30.
Figure 33:
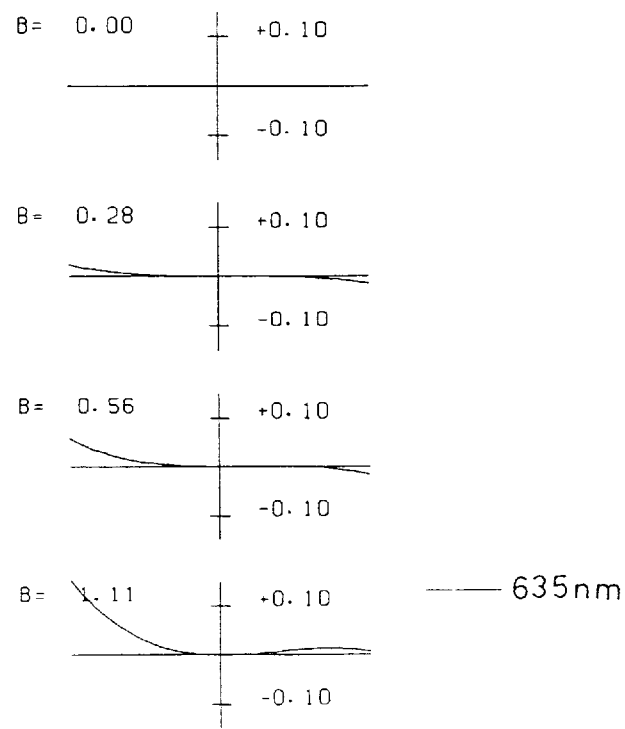
FIG. 33 is a diagram showing wavefront aberrations of the beam expander shown in FIG. 30.

Numerical data regarding the beam expander BE is shown in Table 4 below. The longitudinal aberrations, the lateral aberrations and the wavefront aberrations are shown in FIGS. 31 through 33, respectively. The aberrations are those on the image forming surface when light is incident thereon from the left side in FIG. 30.

TABLE 4

| curvature No. | Ri | Di | n | v |
|---|---|---|---|---|
| 1 | −226.334 | 2.50 | 1.83925 | 23.8 |
| 2 | 41.595 | 30.86 | | |
| 3 | 302.150 | 3.80 | 1.49566 | 81.6 |
| 4 | −42.213 | — | | |

Figure 34:
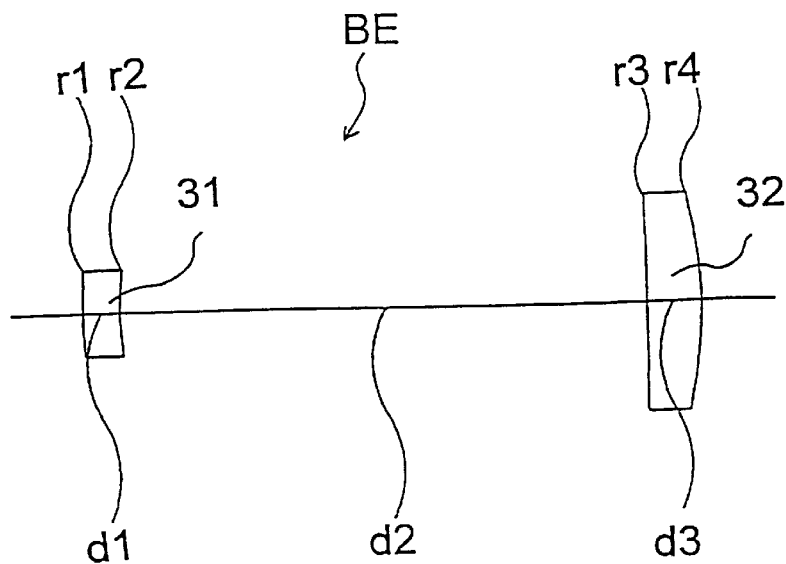
FIG. 34 is a schematic view of a third example of a lens arrangement of a beam expander which can be applied to a laser projecting apparatus.
Figure 35:
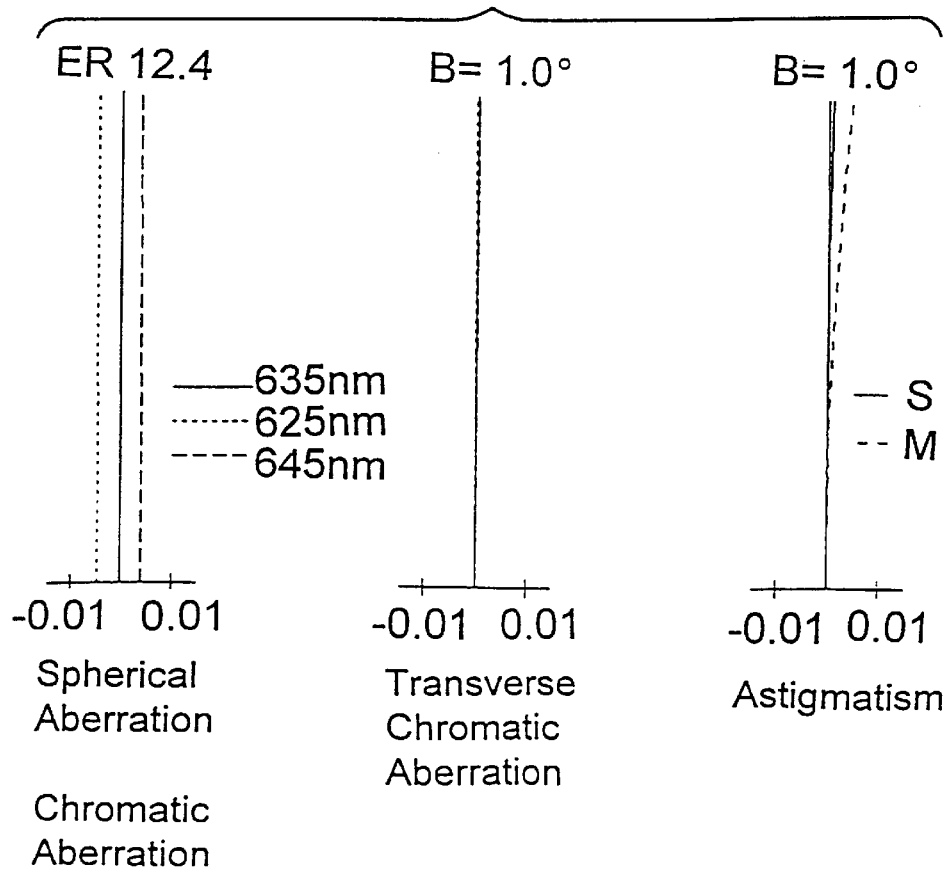
FIG. 35 is a diagram showing longitudinal aberrations of the beam expander shown in FIG. 34.
Figure 36:
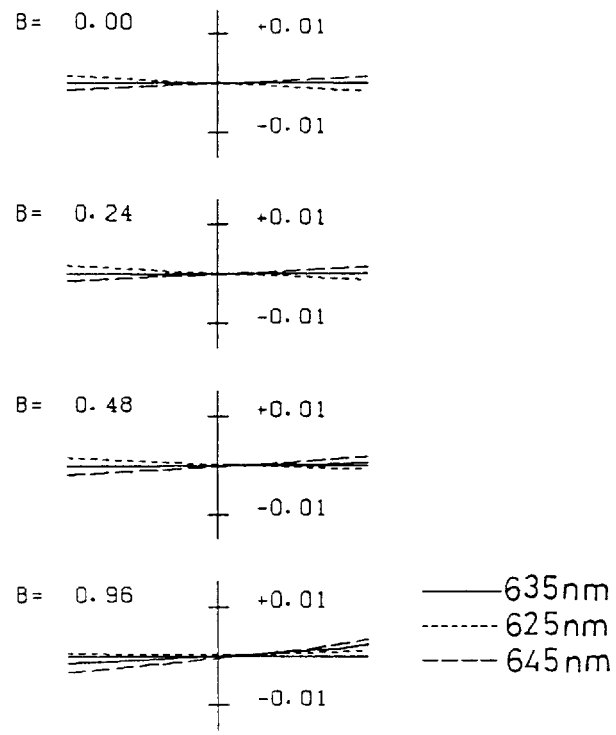
FIG. 36 is a diagram showing lateral aberrations of the beam expander shown in FIG. 34.
Figure 37:
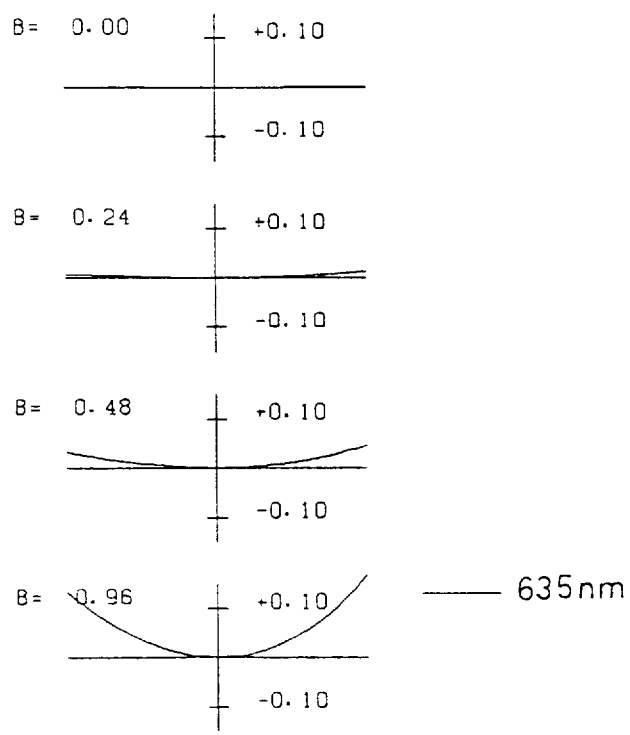
FIG. 37 is a diagram showing wavefront aberrations of the beam expander shown in FIG. 34.

FIG. 34 shows a third example of the beam expander BE. Numerical data regarding this beam expander BE is shown in Table 5 below. The longitudinal aberrations, the lateral aberrations and the wavefront aberrations are shown in FIGS. 35 through 37, respectively. The magnification of the beam expander is 2.07.

TABLE 5

| curvature No. | Ri | Di | n | v |
|---|---|---|---|---|
| 1 | 166.594 | 2.50 | 1.83925 | 23.8 |
| 2 | 25.516 | 36.37 | | |
| 3 | −1170.933 | 3.80 | 1.45438 | 90.3 |
| 4 | −33.184 | — | | |

In the third example of the beam expander BE, the weight of the first lens group 31 is 0.37 g, and the weight of the second lens group 32 is 2.83 g. In view of the weight, the heavier second lens group 32 is secured to the optical path and the relatively light first lens group 31 is moved relative to the second lens group 32. Thus, the burden on the driving system can be reduced.

Figure 38:
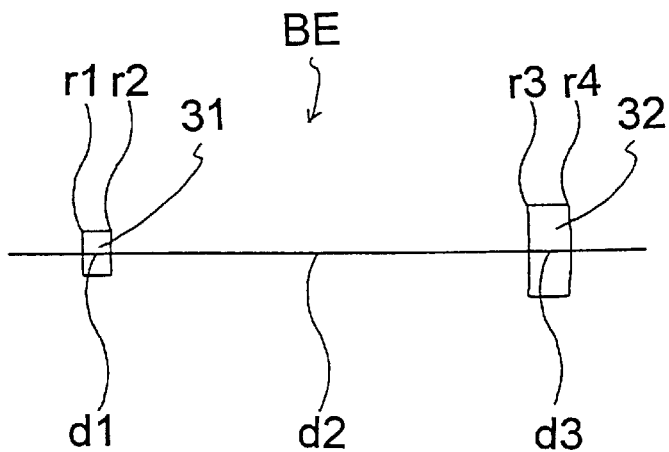
FIG. 38 is a schematic view of a fourth example of a lens arrangement of a beam expander which can be applied to a laser projecting apparatus.
Figure 39:
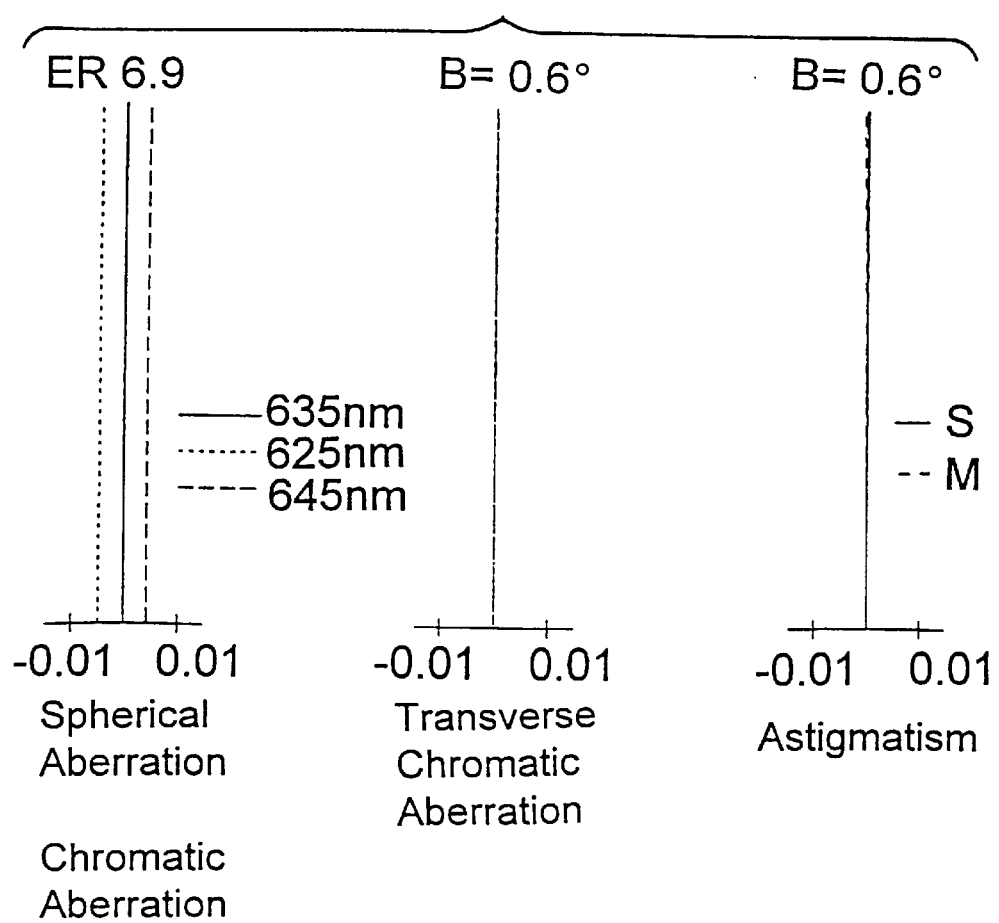
FIG. 39 is a diagram showing longitudinal aberrations of the beam expander shown in FIG. 38.
Figure 40:
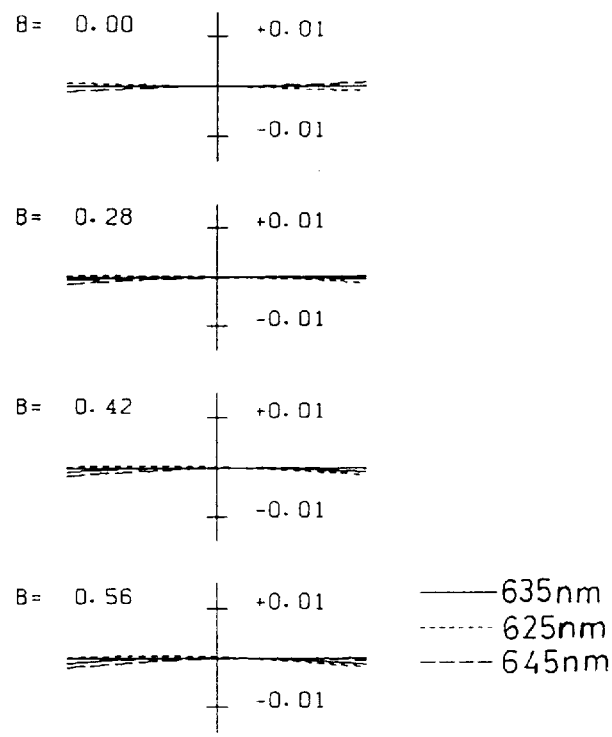
FIG. 40 is a diagram showing lateral aberrations of the beam expander shown in FIG. 38.
Figure 41:
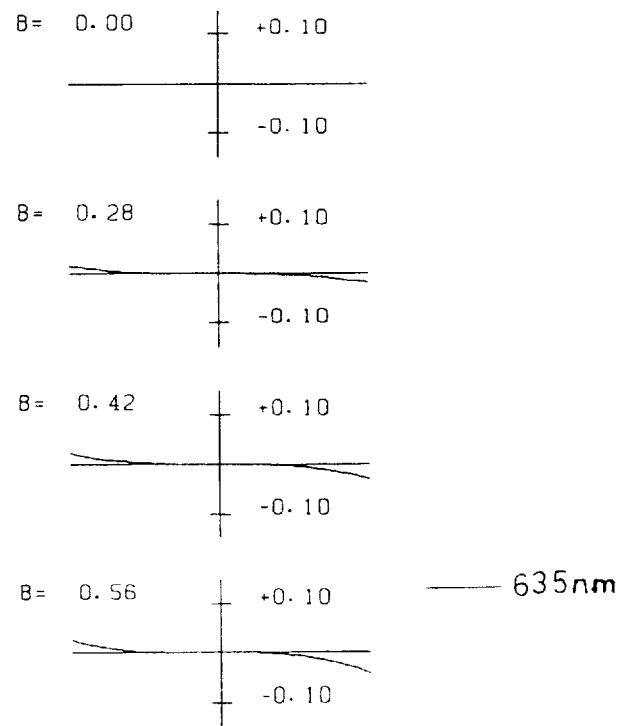
FIG. 41 is a diagram showing wavefront aberrations of the beam expander shown in FIG. 38.

FIG. 38 shows a fourth example of the beam expander BE. Numerical data regarding this beam expander BE is shown in Table 6 below. The longitudinal aberrations, the lateral aberrations and the wavefront aberrations are shown in FIGS. 39 through 41, respectively. The magnification of the beam expander is 1.70.

TABLE 6

| curvature No. | Ri | Di | n | ν |
|---|---|---|---|---|
| 1 | 88.796 | 2.50 | 1.79857 | 25.4 |
| 2 | 29.160 | 39.79 | | |
| 3 | −122.664 | 3.80 | 1.45488 | 90.3 |
| 4 | −32.265 | — | | |

Figure 42:
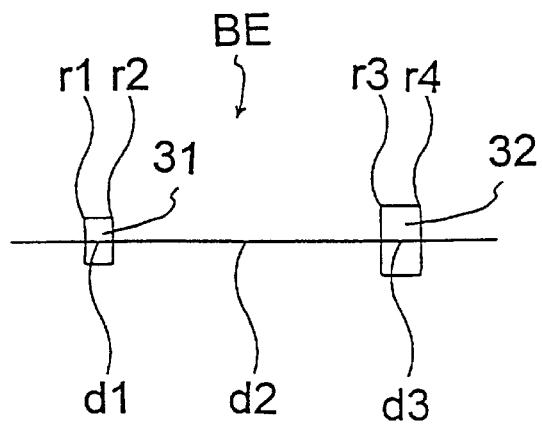
FIG. 42 is a schematic view of a fifth example of a lens arrangement of a beam expander which can be applied to a laser projecting apparatus.
Figure 43:
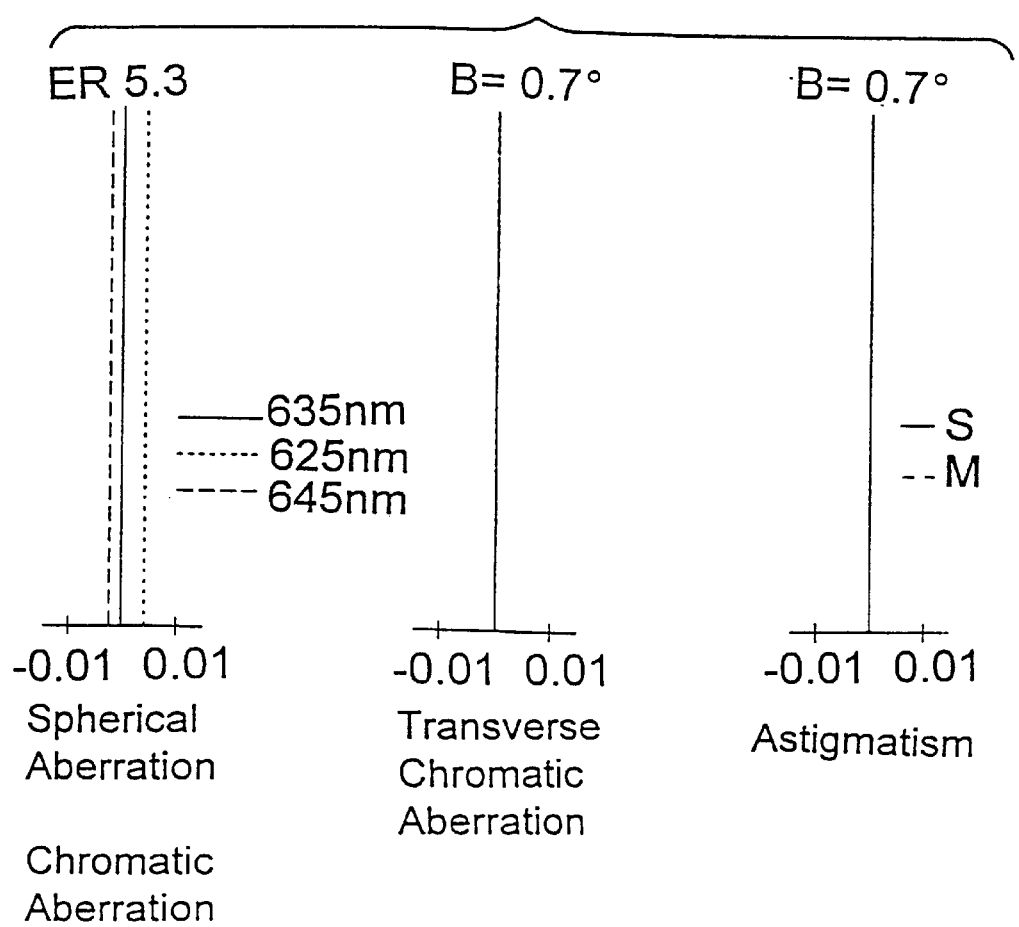
FIG. 43 is a diagram showing longitudinal aberrations of the beam expander shown in FIG. 42.
Figure 44:
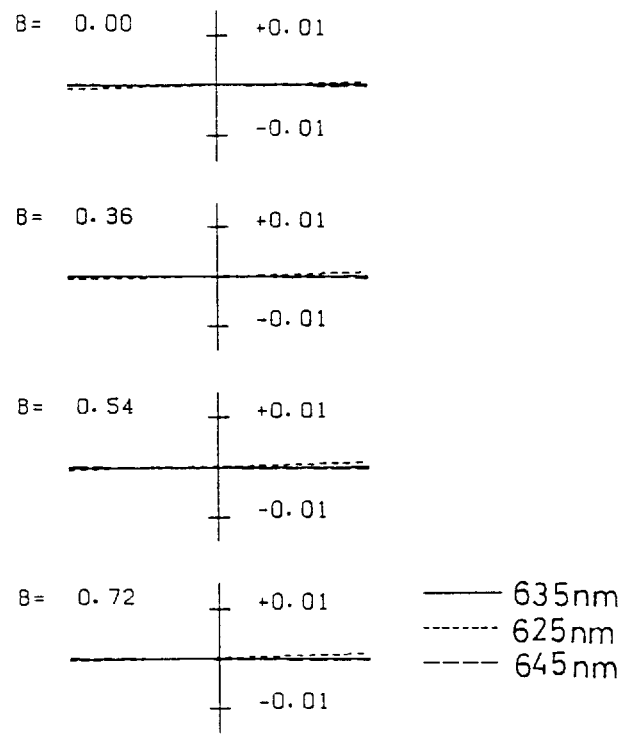
FIG. 44 is a diagram showing lateral aberrations of the beam expander shown in FIG. 42.
Figure 45:
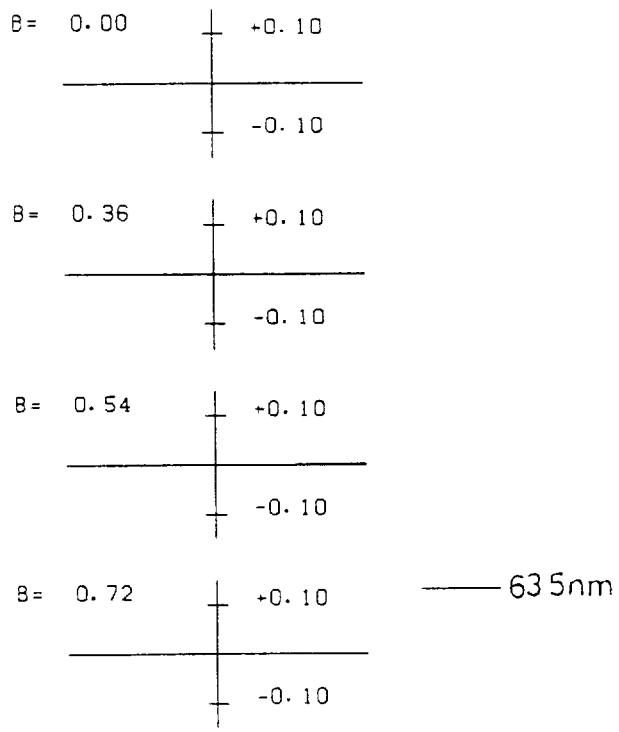
FIG. 45 is a diagram showing wavefront aberrations of the beam expander shown in FIG. 42.

FIG. 42 shows a fifth example of the beam expander BE. Numerical data regarding this beam expander BE is shown in Table 7 below. The longitudinal aberrations, the lateral aberrations and the wavefront aberrations are shown in FIGS. 43 through 45, respectively. The magnification of the beam expander is 1.33.

TABLE 7

| curvature No. | Ri | Di | n | ν |
|---|---|---|---|---|
| 1 | −68.751 | 2.50 | 1.55463 | 58.7 |
| 2 | 121.059 | 23.37 | | |
| 3 | 330.562 | 3.50 | 1.57838 | 40.7 |
| 4 | −74.023 | — | | |

The following discussion will be addressed to a third embodiment of the present invention with reference to FIGS. 46 through 53.

Figure 46:
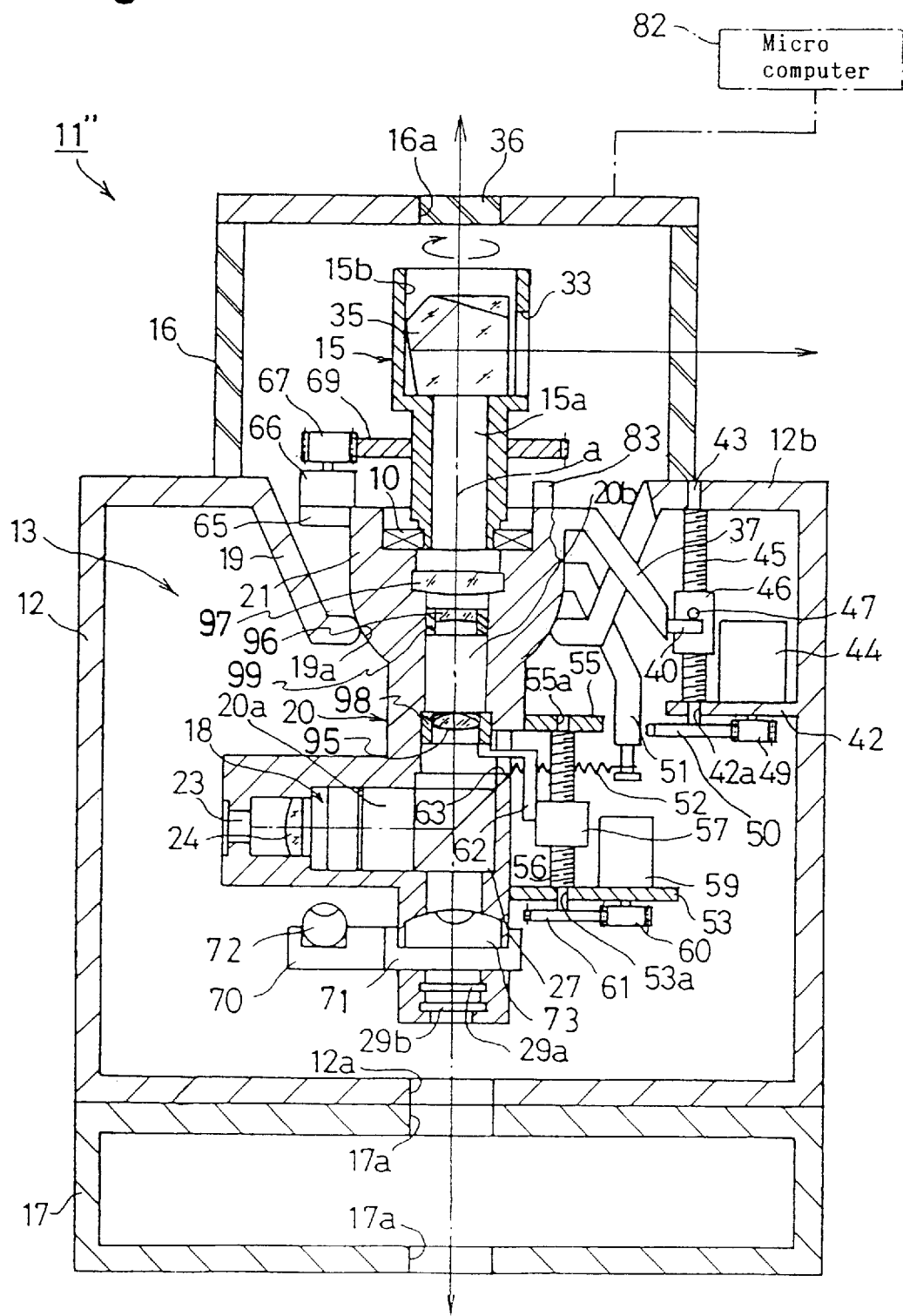
FIG. 46 is a sectional view of a laser projecting apparatus according to a third embodiment of the present invention.
Figure 47:
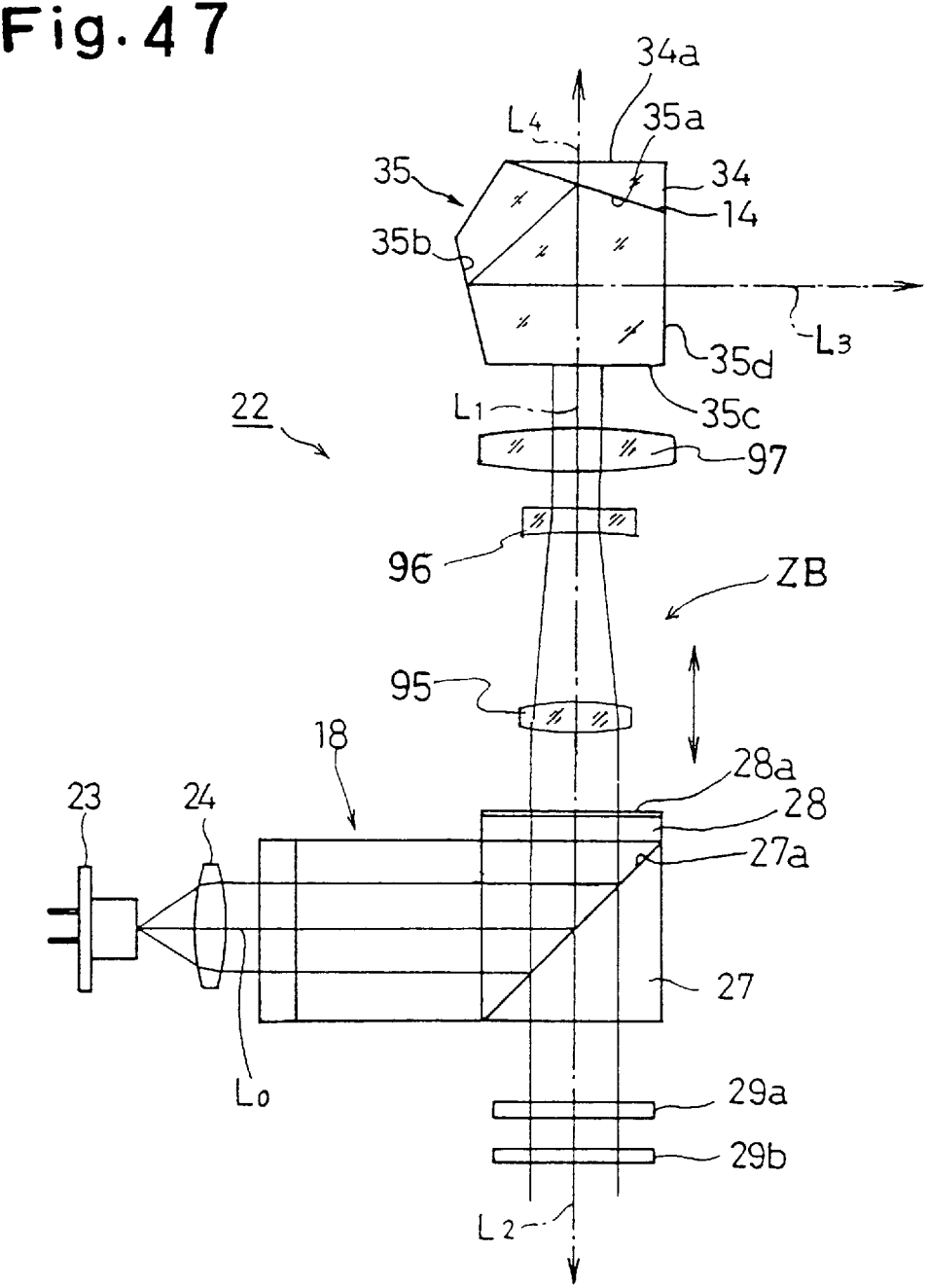
FIG. 47 is an enlarged schematic view of the main components of the laser projecting apparatus shown in FIG. 46.

As can be seen in FIGS. 46 and 47, the structure of the laser projector 11" is substantially the same as that of the laser projector 11' according to the second embodiment, except that the beam expander BE is replaced with a zooming beam expander ZB, and the driving mechanism for the zooming beam expander ZB is different from that for the beam expander BE.

The laser projector 11" is comprised of a first lens group (first movable lens group) 95 having a positive power, a second lens group (second movable lens group) 96 having a negative power, and a third lens group (stationary lens group) 97 having a positive power, all above the PBS 27 in the optical path 20b. The third lens group 97 is secured to the optical path 20b adjacent to the pentagonal prism 35. The first and second lens groups 95 and 96 are held by cylindrical members (lens holders) 98 and 99 which are slidably inserted in the optical path 20b, so that the first and second lens groups are moved in the optical path 20b when the lens holders 98 and 99 are moved. The first, second and third lens groups 95, 96 and 97 constitute a zooming beam expander ZB (beam diameter varying optical system) which magnifies or reduces the diameter of the laser beams emitted from the laser diode 23 and collimated by the collimating lens 24 before reaching the pentagonal prism 35, by varying the magnification (beam diameter magnifying or reducing rate). Data on the loci along which the first, second and third lens groups 95, 96, and 97 are relatively moved upon varying the magnification is pre-stored in the microcomputer 82.

The mechanism for driving the first lens group 95 is the same as that for driving the first lens group 31 in the first and second embodiments mentioned above. Namely, when the lens driving motor 59 is driven in accordance with the signals supplied from the microcomputer 82, the cylindrical member 98 is moved up and down through the feed screw mechanism including the lens moving screw 56, the lens moving nut 57, and the link 62, so that the first lens group 95 is moved relative to the third lens group 97 (or the second lens group 96).

The laser projector 11" is also provided, in FIG. 46, with a mechanism (on the blind side of FIG. 46, i.e. not shown) similar to the feed screw mechanism to move the cylindrical member 98, and a feed screw mechanism (not shown) to move the cylindrical member 99 in the optical path 20b. When the feed screw mechanism is driven in accordance with command signals from the microcomputer 82, the cylindrical member 99 and accordingly the second lens group 96, are moved relative to the third lens group 97. Consequently, when the two feed screw mechanisms are driven in accordance with command signals from the microcomputer 82 in which the locus data of the movement of the lens groups is pre-stored, the first and second lens groups 95 and 96 are relatively moved in the optical path 20b to vary the magnification to thereby increase or reduce the beam diameter of the laser beams $L_3$ to be projected from the light emitter 15 (FIGS. 48 through 50).

Figure 48:
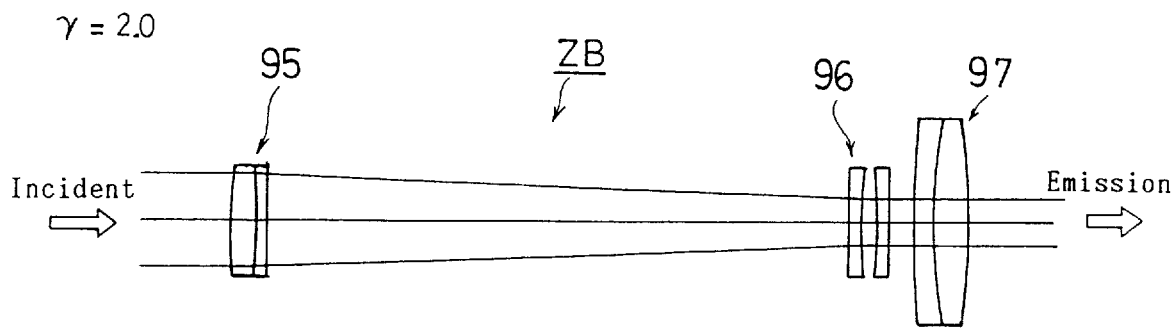
FIGS. 48, 49 and 50 are schematic views of a lens arrangement of a zooming beam expander applied to a laser projecting apparatus, shown at a minimum magnification, an intermediate magnification, and a maximum magnification, of the beam diameter, respectively.
Figure 49:
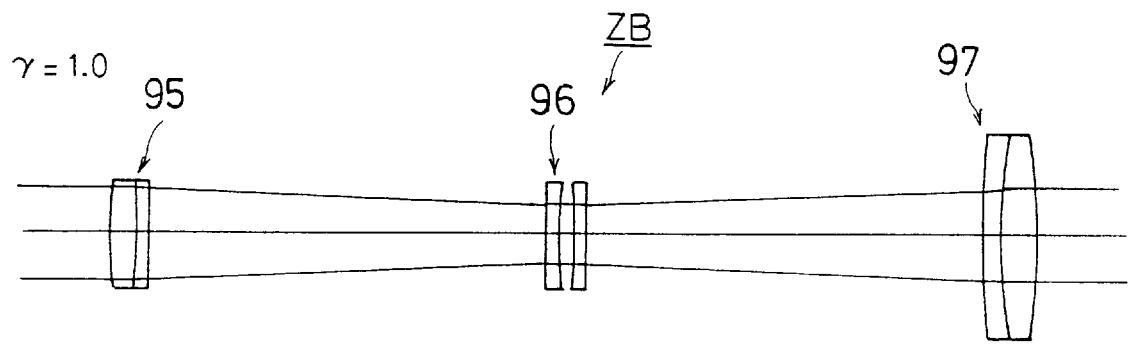
Figure 50:
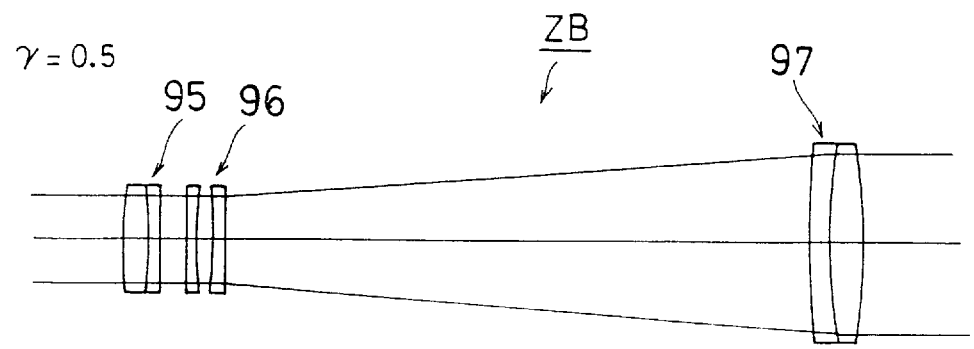

FIGS. 48 through 50 show an example of the zooming beam expander ZB which can be applied to the laser projector 11". FIGS. 48 and 50 correspond to the minimum and maximum magnifications of the beam diameter, respectively. FIG. 49 shows a transfer from the minimum magnification in FIG. 48 to the maximum magnification in FIG. 50.

Figure 51:
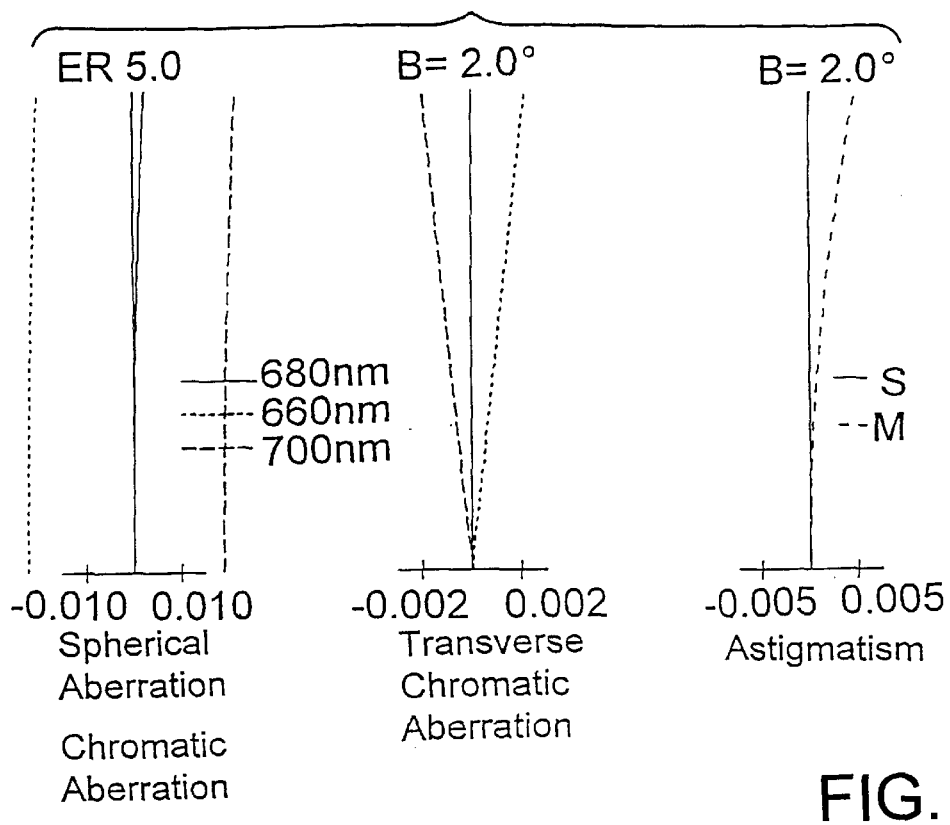
FIG. 51 is a diagram showing longitudinal aberrations of the beam expander shown in FIG. 48.
Figure 52:
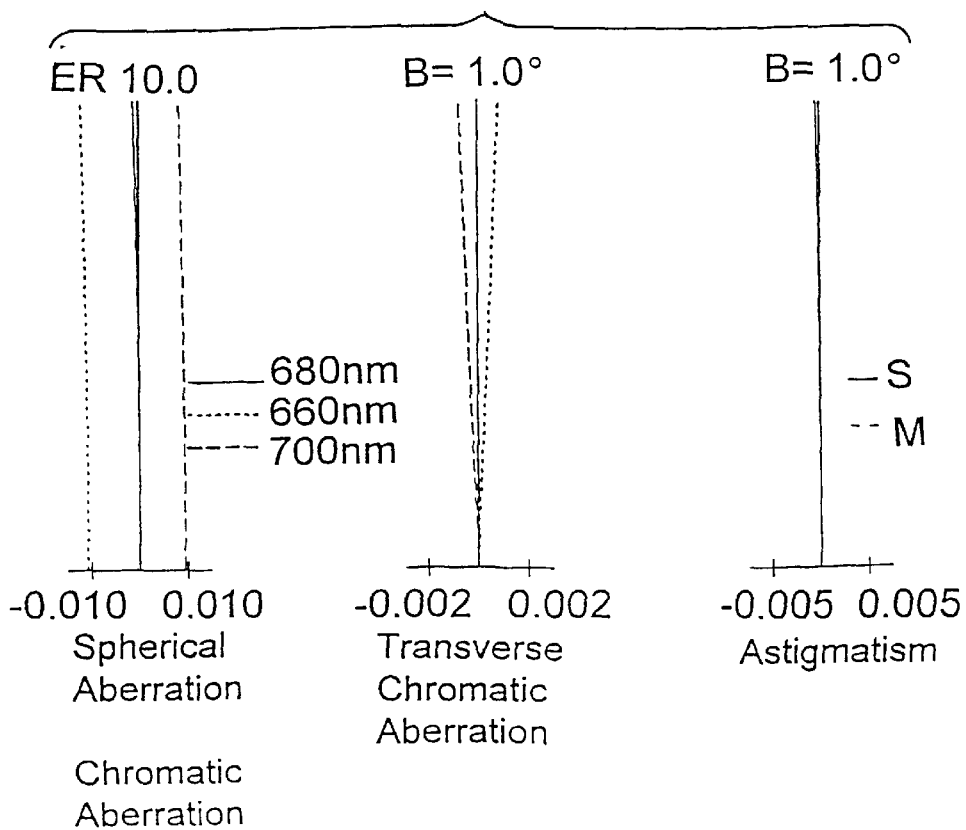
FIG. 52 is a diagram showing longitudinal aberrations of the beam expander shown in FIG. 49.
Figure 53:
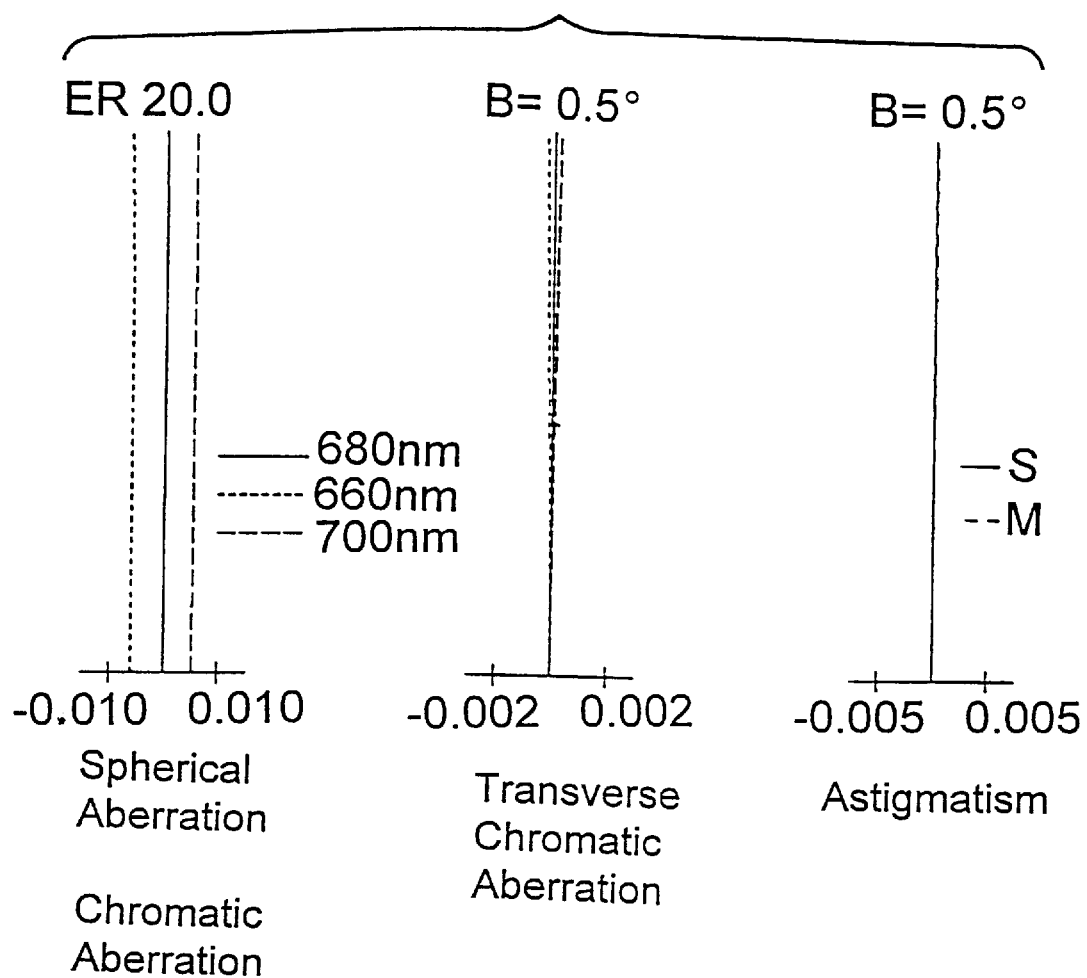
FIG. 53 is a diagram showing longitudinal aberrations of the beam expander shown in FIG. 50; and, FIG. 54 is an enlarged schematic view of the main components of a laser projecting apparatus according to a fourth embodiment of the present invention.

The first lens group 95 and the third lens group 97 are respectively comprised of cemented lenses, and the diameter of the third lens group 97 is larger than that of the first and second lens groups 95 and 96. Numerical data regarding the zooming beam expander ZB is shown in Table 8 below. The longitudinal aberrations corresponding to FIGS. 48 through 50 are shown in FIGS. 51 through 53, respectively. The angle of view of the incident laser beams shown in FIGS. 48 through 53 is not more than 1 degree. The reference design wavelength in the third embodiment is 680 nm.

In FIGS. 48 through 50, the longitudinal aberrations are those when light is incident from the left hand direction. In FIGS. 51 and 52, "ER" designates the diameter of the exit pupil, "B" the emission angle, "S" the sagittal direction, and "M" the meridional direction, respectively. The solid line, the dotted thin line, and the dashed line represent the aberrations at a wavelength of 680 nm, 660 nm, and 700 nm, respectively. The unit used for the spherical aberration and the astigmatism is a diopter and the unit used for the lateral chromatic aberration is a degree (°).

In Table 8, "R" designates the radius of curvature of the lens surfaces reckoned from the light source side (left side), "D" the thickness of the lenses or distance between the lenses reckoned from the light source side, "N" the refractive index of the lenses reckoned from the light source side, at a wavelength of 680 nm, νD the Abbe number of the lenses reckoned from the light source side at the d-line, "ND" the refractive index at the d-line, respectively.

The angular magnification γ is in an inverse proportion to the magnification "M" of light (i.e. M=1/γ). The angular magnifications γ in FIGS. 48, 49 and 50 are 2.0, 1.0 and 0.5, respectively.

The diameter "ER" of the exit pupil is given by ER= (diameter of the incident light)/γ, and the emission angle "B" is given by B=W×γ (W designates the angle of view of incident light). Namely, in the zooming beam expander ZB, the beam diameter (=10 mm) of the incident light can be magnified or reduced by 0.5 times to 2.0 times (5.0 mm to 20 mm).

TABLE 8

| curvature No. | R | D | N | vD | ND |
|---|---|---|---|---|---|
| 1 | 86.889 | 2.500 | 1.65345 | 50.9 | 1.65844 |
| 2 | -83.222 | 1.400 | 1.79363 | 25.4 | 1.80518 |
| 3 | -364.240 | D3 | | | |
| 4 | 1312.040 | 1.400 | 1.76648 | 49.6 | 1.77250 |
| 5 | 56.933 | 1.500 | | | |
| 6 | -55.384 | 1.400 | 1.76648 | 49.6 | 1.77250 |
| 7 | -495.164 | D7 | | | |
| 8 | 227.439 | 2.000 | 1.79363 | 25.4 | 1.80518 |
| 9 | 68.900 | 3.500 | 1.65345 | 50.9 | 1.65844 |
| 10 | -99.869 | — | | | |

In Table 8, D3 designates the distance between the first lens group 95 and the second lens group 96, and is 62.480, 42.850, and 3.6000 corresponding to FIGS. 48, 49, and 50, respectively. D7 designates the distance between the first lens group 96 and the second lens group 97, and is 3.000, 42.620, and 62.430 corresponding to FIGS. 48, 49, and 50, respectively.

The operation of the laser projector 11" as constructed above will now be discussed.

Namely, the laser projector 11" is set at a predetermined position with the help of a tripod, and then the inclination adjustment is completed. When the drive signal is supplied from the microcomputer 82, the laser beams emitted from the laser diode 23 are split into two bundles of beams $L_1$ and $L_2$ which travel upward and downward. The light $L_1$ is transmitted through the first, second and third lens groups 95, 96 and 97 and is deflected by the pentagonal prism 35 by 90 degrees and is emitted from the emission surface 35d in a substantially horizontal direction. In this state, when the rotating motor 66 is driven, the rotatable light emitter 15 begins rotating about the vertical axis "a", so that a horizontal reference plane is defined by the laser beams $L_3$ emitted from the pentagonal prism 35 in the horizontal direction.

The laser projector 11" is used to produce a reference point or measure a height over the distance range, ranging from a close distance of 0.5 m to 1.5 m, to a far distance of 100 m to 200 m. The emitted parallel laser beams change in diameter due to diffraction. Accordingly, it is necessary to increase the diameter of the laser beams emitted from the projector in order to make it possible for the beams to reach into the far distance or it is necessary to reduce the diameter of the emitted beams in order to minimize a failure to visually confirm the position of the beam spot at a close distance.

In the laser projector 11" according to the present invention, since the zooming beam expander ZB is driven in accordance with the command signal from the microcomputer 82 to vary the beam diameter, a desired diameter of a bundle of beams can be easily obtained to respond to the requirements mentioned above.

Namely, to project the laser beams into the far distance, an adjusting switch (not shown) is actuated to move the first and second lens groups 95 and 96 relative to the third lens group 97 along a predetermined locus. Consequently, the zooming beam expander ZB is brought into the position shown in FIG. 49, the angular magnification γ is 0.5 times, that is, the magnification "M" of the beam is 2. To further magnify the beam diameter, further driving of the zooming beam expander ZB takes place to relatively move the first and second lens groups 95 and 96 along a predetermined locus. As a result, when the zooming beam expander ZB comes to a position shown in FIG. 50, the angular magnification γ is ¼, that is, the magnification "M" is 4. Conversely, when the laser projector 11" is used at a relatively close distance, an adjusting switch (not shown) is actuated to drive the zooming beam expander ZB in the direction opposite to the direction upon magnifying the beam diameter to reduce the beam diameter.

From the foregoing, in the laser present invention, the zooming beam expander ZB of laser projection 11 is driven based on the locus data of the movement stored in the microcomputer 82 to magnify or reduce the beam diameter to obtain the desired diameter of a beam bundle in accordance with need. The zooming beam expander ZB receives the complete amount of the laser beams emitted from the laser diode 23 and emits the same, therefore there is no light loss upon varying the beam diameter.

Therefore, the beam diameter to be emitted can be appropriately varied to be at an optimum value at a desired distance, and accordingly, the laser projector can be effectively used outdoors. Consequently, for example when the height of the beam spot is detected by a detector, the sensitivity of detection is uniform regardless of the distance and a visual confirmation of the beam spot can be reliably effected.

Note that although the third lens group 97 is stationary and the first and second lens groups 95 and 96 are movable in the third embodiment, it is possible to make the third lens group 97 located on the emission side movable, so that focusing is carried out by the movement of the third lens group 97 which has the largest lens diameter to obtain the smallest beam diameter at a desired distance. Furthermore, there is no focusing error upon variation in the magnification.

Although the zooming beam expander ZB is driven by the operation of an adjusting switch (not shown) in the third embodiment, it is possible to provide a signal receiver per se known in the laser projector 11", so that the zooming beam expander ZB can be driven based on a predetermined locus of the movement in accordance with a remote control signal which is received by the signal receiver to magnify or reduce the beam diameter.

Moreover, although the laser projector 11" is comprised of the zooming beam expander ZB including three lens groups, i.e., the first, second and third lens groups 95, 96 and 97, in the third embodiment, it is possible to use a beam expander BE having two lens groups. The beam expander BE is, for example, comprised of first and second lens groups 106 and 107 (FIG. 54) of positive and negative power that are fixed to the inner wall of the optical path 20b (FIG. 46) in a predetermined relationship, respectively.

A fourth embodiment of the present invention which can be advantageously applied to a beam expander BE having a constant magnification, provided in the optical path will be described below. In the laser projector 111 of the fourth embodiment, the beam diameter is varied by a variable diaphragm provided in the optical path, instead of by the zooming beam expander ZB as in the third embodiment. The variable diaphragm which is per se known is actuated by a drive mechanism (not shown) to vary the diameter of a light intercepting mask to thereby magnify or reduce the beam diameter.

Figure 54:
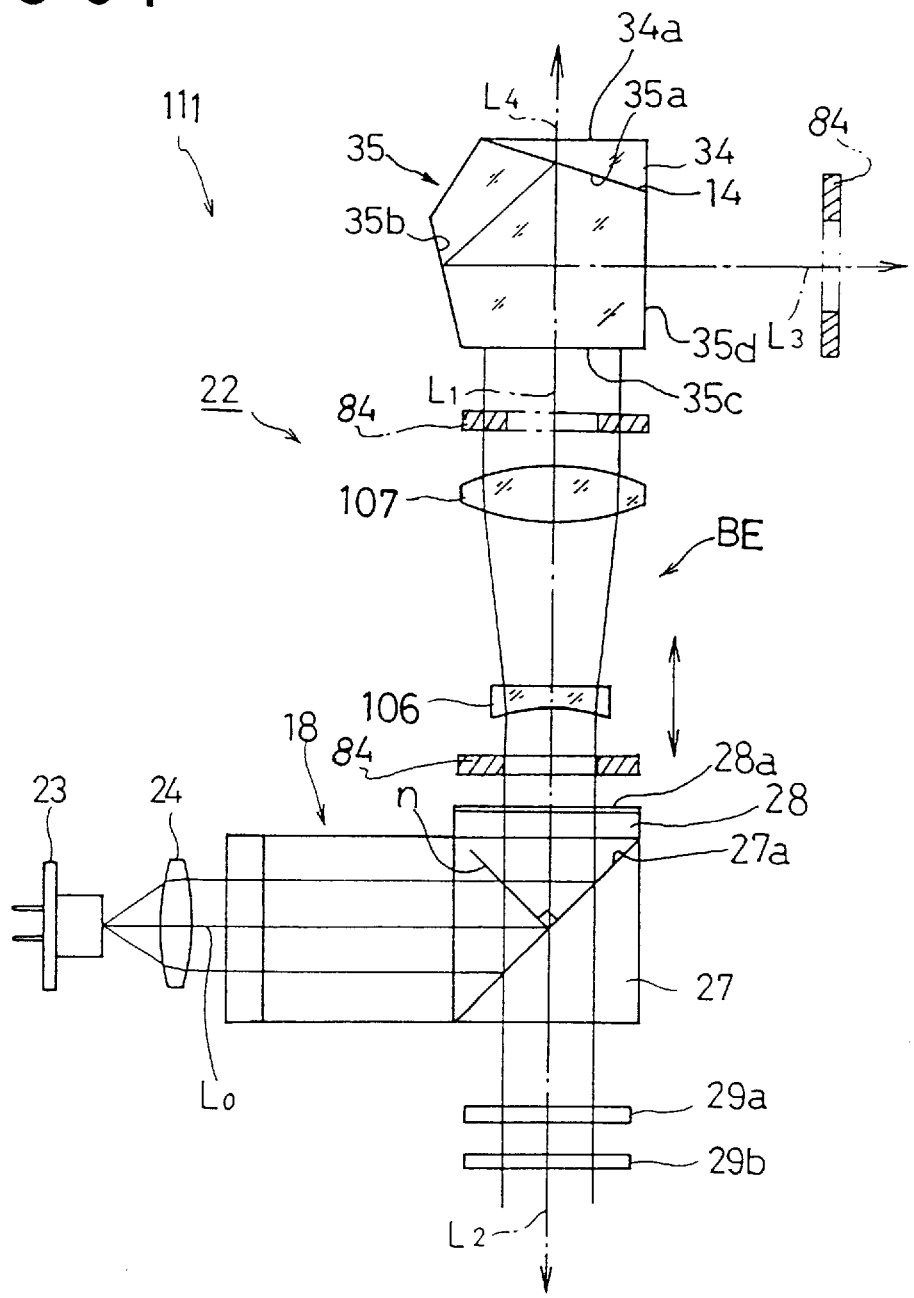

The variable diaphragm 84 is provided between the PBS 27 and the first lens group 106 in the optical path 20b (FIG. 46) or between the second lens group 107 and the pentagonal prism 35, as shown ill FIG. 54. The variable diaphragm 84 can be actuated manually or automatically by the operation of a switch (not shown) to stop the laser beams $L_1$ to thereby increase or decrease the diameter of the laser beams $L_3$ emitted from the pentagonal prism 35.

Alternatively, the variable diaphragm 84 can be provided on the emission side of the pentagonal prism 35 (i.e., optically behind the pentagonal prism) as indicated by a phantom line in FIG. 54. In this case, the laser beams $L_3$ emitted from the pentagonal prism 35 are stopped by the diaphragm 84 to magnify or reduce the diameter of the beams to be emitted from the rotatable light emitter 15. Thus, in the fourth embodiment, substantially the same effects as of the third embodiment using the zooming beam expander ZB, can be obtained though there is a slight light loss in the fourth embodiment.

As can be understood from the above discussion, in either the laser projector 11″ or 111 according to the present invention, the diameter of the beams of light to be projected can, at a desired distance, be easily set to be at an optimum value, and accordingly, the laser projector can be effectively used outdoors. Consequently, for example, when the height of the beam spot is detected by a detector, the sensitivity of detection is uniform regardless of the distance and an enhanced reliability in the visual confirmation of the beam spot can be achieved.

Although the invention has been described with reference to particular means, materials and embodiments, it is to be understood that the invention is not limited to the particulars disclosed and extends to all equivalents within the scope of the claims.

We claim:

1. A beam projecting apparatus comprising:
   a light source;
   reflecting means for reflecting and rotating a bundle of light emitted from said light source to form a reference plane; and
   a shape converting optical system provided in an optical path from said light source to said reflecting means to convert said bundle of light from an elliptical sectional shape to a circular sectional shape.

2. A beam projecting apparatus according to claim 1, said shape converting optical system comprising an anamorphic optical system.

3. A beam projecting apparatus according to claim 1, said shape converting optical system comprising an anamorphic optical system extending a minor axis of said elliptical sectional shape to obtain a circular light bundle.

4. A beam projecting apparatus according to claim 1, said shape converting optical system comprising an anamorphic optical system contracting a major axis of said elliptical sectional shape to obtain a circular light bundle.

5. A beam projecting apparatus according to claim 2, said anamorphic optical system comprising a pair of cylindrical lenses having different first and second focal lengths and having a same focal point, said first and second focal lengths of said cylindrical lenses producing a magnification, said magnification produced according to a formula:

$$m = Do/Di = |f_2/f_1|,$$

wherein m represents said magnification;

Do represents a length of a major axis of said elliptical sectional shape;

Di represents a length of a minor axis of said elliptical sectional shape;

$f_1$ represents said first focal length, a one of the pair of cylindrical lenses having said first focal length being located closer to the light source than an other of the pair of cylindrical lenses; and, $f_2$ represents said second focal length.

6. A beam projecting apparatus according to claim 1, further comprising a collimating lens between said light source and said shape converting optical system to collimate said bundle of light emitted from said light source; and means for varying a distance between said light source and said collimating lens for correcting an astigmatic difference within said light bundle.

7. A beam projecting apparatus according to claim 1, said light source comprising a laser diode for emitting visible light.

8. A beam projecting apparatus according to claim 1, said shape converting optical system comprising first and second anamorphic prisms provided on an optical axis of said bundle of light emitted from said light source, said first anamorphic prism positioned between said second anamorphic prism and said light source, wherein an Abbe number of said first anamorphic prism $v_1$ and an Abbe number of said second anamorphic prism $v_2$ satisfy a relationship:

$$v_2/v_1 > 1.8,$$

wherein $v_2 > v_1$.

9. A beam projecting apparatus according to claim 1, said shape converting optical system comprising a pair of anamorphic prisms provided on an optical axis of said bundle of light emitted from said light source, said pair of anamorphic prisms arranged to deflect said bundle of light in opposite directions.

10. A beam projecting apparatus according to claim 1, said optical path comprising a first optical path in which the light source is located, and a second optical path, perpendicular to said first optical path, said bundle of light being transmitted to said reflecting means along said second optical path.

11. A beam protecting apparatus according to claim 10, further comprising a polarization beam splitter positioned at an intersecting portion of said first optical path and said second optical path to deflect said bundle of light emitted from said light source toward said reflecting means.

12. A beam projecting apparatus according to claim 11, said shape converting optical system provided between said light source and said polarization beam splitter.

13. A beam projecting apparatus comprising:
   a light source; and
   an optical member for reflecting and rotating a bundle of light emitted from said light source to form a reference plane;
   said optical member comprising:
      a prism having an incident surface for receiving said bundle of light from said light source incident upon said incident surface, a first reflecting surface provided with a semitransparent film, for receiving said incident bundle of light, a second reflecting surface, positioned at an angle of 45 degrees with respect to said first reflecting surface, for reflecting a portion of said incident bundle of light reflected by said first reflecting surface, and an emission surface for emitting said reflected portion of said incident bundle of light reflected by said second reflecting surface; and
      a wedge-shaped prism, attached to said first reflecting surface of said prism through said semitransparent film, said wedged-shaped prism provided with a second emission surface parallel with said incident surface.

14. A beam projecting apparatus according to claim 13, said prism comprising a pentagonal prism.

15. A beam projecting apparatus comprising:
   a light source for emitting light;
   reflecting means for reflecting and rotating a bundle of light emitted from said light source to form a reference plane;

a polarization beam splitting element for reflecting linearly polarized light emitted from said light source toward said reflecting means;

a retarder for varying a polarization of said reflected linearly polarized light, travelling toward said reflecting means; and beam splitting means for permitting a portion of said light emitted from said light source to pass through said polarization beam splitting element in a first direction toward said reflecting means and for reflecting a remaining portion of said light in a direction opposite said first direction.

16. A beam projecting apparatus according to claim 15, said polarization beam splitting element comprising a polarization beam splitter.

17. A beam projecting apparatus according to claim 16, said retarder comprising a quarter-wavelength plate, positioned between said polarization beam splitting element and said beam splitting means.

18. A beam projecting apparatus according to claim 17, said quarter-wavelength plate integrally attached to said polarization beam splitting element.

19. A beam projecting apparatus according to claim 17, said beam splitting means provided on a surface of said quarter-wavelength plate opposite said polarization beam splitting element.

20. A beam projecting apparatus according to claim 19, said beam splitting means comprising a semitransparent film provided on said surface of said quarter-wavelength plate opposite said polarization beam splitting element.

21. A beam projecting apparatus according to claim 16, said reflecting means comprising a pentagonal prism including a first reflecting surface with a semitransparent film for receiving said light emitted from said light source, and a second reflecting surface, positioned at an angle of 45 degrees with respect to said first reflecting surface, for reflecting light reflected by said first reflecting surface.

22. A beam projecting apparatus in which a bundle of light emitted from a light source is reflected by reflecting means and is projected as nearly parallel beams of light, comprising:

a collimating lens for collimating said bundle of light emitted from said light source;

a beam diameter widening optical system, positioned between said collimating lens and said reflecting means, including first and second lens groups, said first lens group having a negative power and located between said collimating lens and said second lens group, and said second lens group having a positive power and located between said reflecting means and said first lens group, said beam diameter widening optical system magnifying said diameter of said bundle of light emitted from said light source before said bundle of light is reflected by said reflecting means; and adjusting means for adjusting a relative position of said first and second lens groups for adjusting a position of a beam waist of said bundle of light to be projected.

23. A beam projecting apparatus according to claim 22, said second lens group being fixedly positioned between said collimating lens and said reflecting means, and said first lens group being supported by a lens holder and being movable in the optical path relative to the second lens group.

24. A beam projecting apparatus according to claim 22, said first lens group being fixedly positioned between said collimating lens and said reflecting means, and said second lens group being supported by a lens holder and being movable in the optical path relative to the first lens group.

25. A beam projecting apparatus according to claim 22, said reflecting means, including a rotatable member for rotating about a rotation axis, for projecting said light reflected from said reflecting means in a direction substantially perpendicular to said rotation axis and for forming a reference plane when said rotating member rotates.

26. A beam projecting apparatus comprising:

a light source;

means for projecting a bundle of light emitted from said light source as nearly parallel beams of light;

a beam diameter varying optical system provided in an optical path of said nearly parallel beams of light emitted from the light source for varying a diameter of said nearly parallel beams of light at a variable magnification; and a reflecting device for reflecting and rotating said nearly parallel beams of light emitted from said light source.

27. A beam projecting apparatus according to claim 26, said beam diameter varying optical system comprising a zooming beam expander including a first lens group of positive power, a second lens group of negative power, and a third lens group of positive power, in this order from a light source side, for varying said beam diameter according to a relative positioning of said first, second and third lens groups.

28. A beam projecting apparatus according to claim 27, said first lens group comprising a movable lens group, said third lens group comprising a stationary lens group and said second lens group being movable between the first and third lens groups.

29. A beam projecting apparatus according to claim 28, wherein said reflecting device is provided on an emission side of said zooming beam expander for reflecting said light emitted from said zooming beam expander.

30. A beam projecting apparatus according to claim 29, further comprising a collimating lens provided between said light source and said beam diameter varying optical system for collimating said light emitted from said light source.

31. A beam projecting apparatus according to claim 30, said reflecting device comprising a rotatable member for rotating about a rotation axis, said light from said reflecting device being projected in a direction substantially perpendicular to said rotation axis for forming a reference plane when said rotatable member rotates.

32. A beam projecting apparatus comprising:

a light source;

means for projecting a bundle of light emitted from said light source as nearly parallel beams of light; and, a variable diaphragm, provided in an optical path of said nearly parallel beams of light emitted from said light source, for intercepting a variable amount of said nearly parallel beams of light for varying a beam diameter; and a reflecting device for reflecting and rotating said nearly parallel beams of light emitted from said light source.

33. A beam projecting apparatus according to claim 32, further comprising a beam expander in said optical path of said light emitted from said light source, said beam expander including a first lens group of negative power and a second lens group of positive power, in this order from a light source side, said beam diameter being variable by relatively positioning said first and second lens groups.

34. A beam projecting apparatus according to claim 33, said variable diaphragm provided between said light source and said beam expander.

35. A beam projecting apparatus according to claim 33, wherein said reflecting device is provided on an emission side of said beam expander, for reflecting said light from said beam expander to obtain nearly parallel beams of light.

36. A beam projecting apparatus according to claim 35, said variable diaphragm provided in the optical path between said reflecting device and said beam expander.

37. A beam projecting apparatus according to claim 35, said variable diaphragm is provided on an emission side of said reflecting device.

38. A beam projecting apparatus according to claim 35, said reflecting device comprising a rotatable member for rotating about a rotation axis, light reflected from said reflecting device being projected in a direction substantially perpendicular to said rotation axis, for forming a reference plane when said rotating member rotates.

* * * * *